Figure 1:
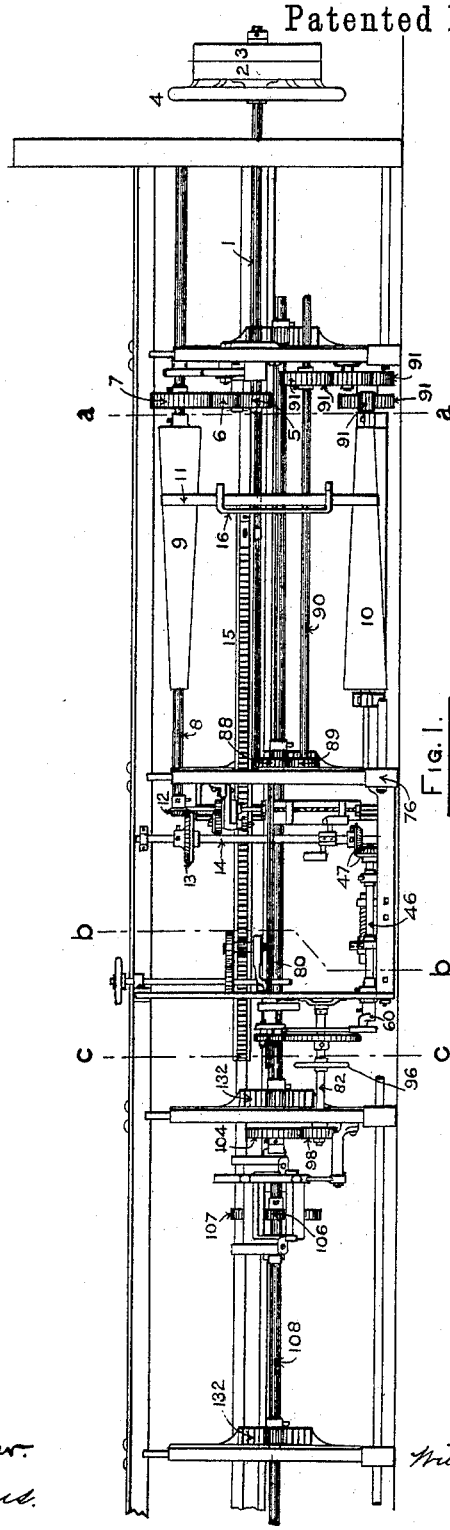

(No Model.) 20 Sheets—Sheet 1.
W. P. CANNING.
MECHANISM CONNECTED WITH THE LIFTING OR TRAVERSE RAILS OF FLY FRAMES.
No. 485,171. Patented Nov. 1, 1892.

WITNESSES.
Channing Whitaker.
Saml. G. Stephens.

INVENTOR.
William Pitt Canning.

(No Model.) 20 Sheets—Sheet 2.

W. P. CANNING.
MECHANISM CONNECTED WITH THE LIFTING OR TRAVERSE RAILS OF FLY FRAMES.

No. 485,171. Patented Nov. 1, 1892.

WITNESSES.
Channing Whitaker
Sam'l G. Stephens

INVENTOR.
William Pitt Canning (No Model.) 20 Sheets—Sheet 3.

W. P. CANNING.
MECHANISM CONNECTED WITH THE LIFTING OR TRAVERSE RAILS OF FLY FRAMES.

No. 485,171. Patented Nov. 1, 1892.

WITNESSES.
Channing Whitaker.
Saml. G. Stephens.

INVENTOR.
William Pitt Canning.

(No Model.) 20 Sheets—Sheet 4.

W. P. CANNING.
MECHANISM CONNECTED WITH THE LIFTING OR TRAVERSE RAILS OF FLY FRAMES.

No. 485,171. Patented Nov. 1, 1892.

WITNESSES. INVENTOR.

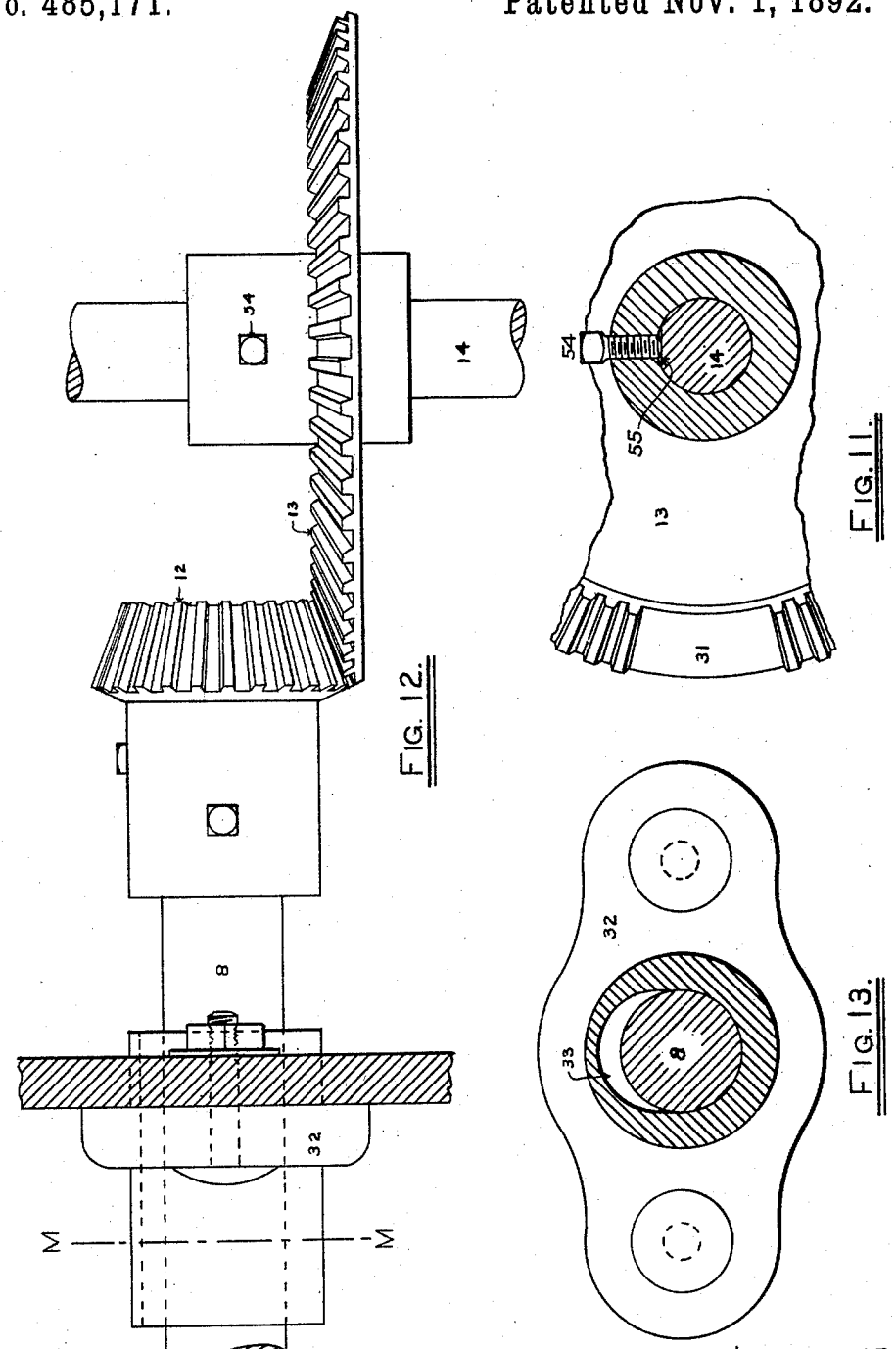

(No Model.) 20 Sheets—Sheet 6.
W. P. CANNING.
MECHANISM CONNECTED WITH THE LIFTING OR TRAVERSE RAILS OF FLY FRAMES.
No. 485,171. Patented Nov. 1, 1892.
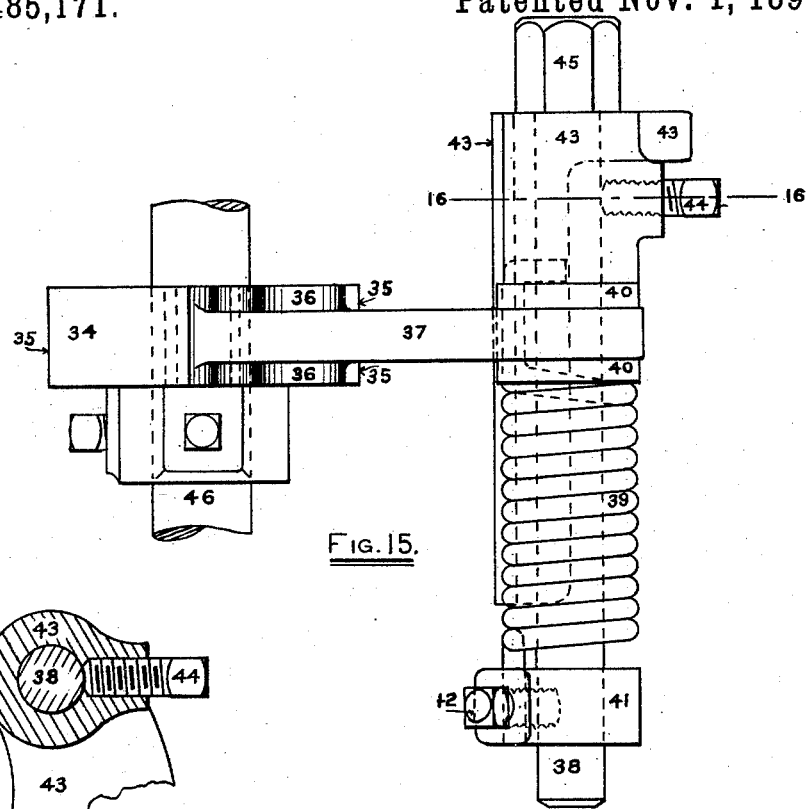
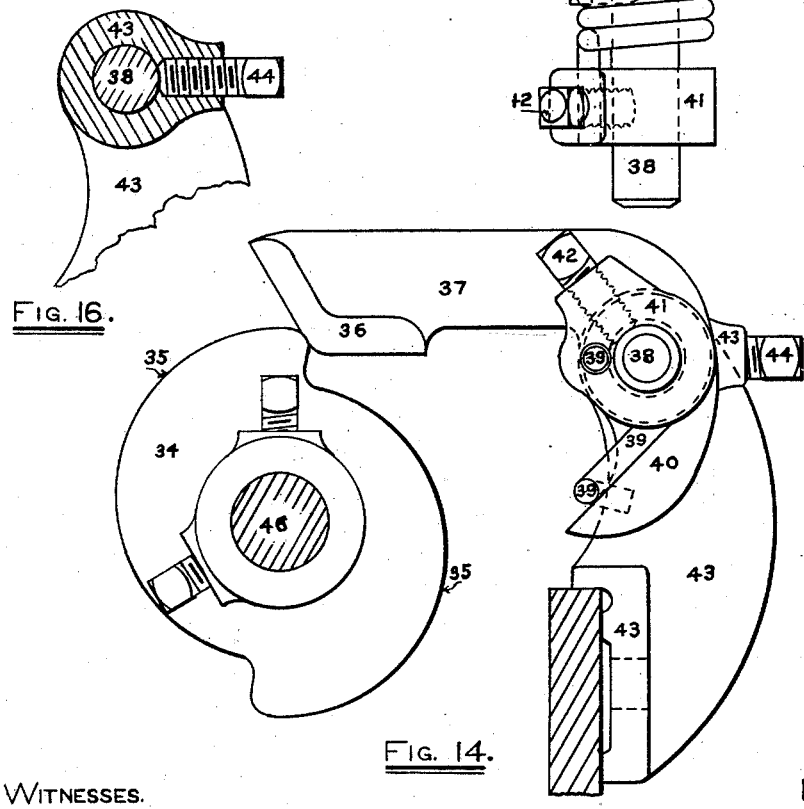
WITNESSES.
Channing Whitaker
Sam! G. Stephens
INVENTOR.
William Pitt Canning.

(No Model.)  20 Sheets—Sheet 7.
W. P. CANNING.
MECHANISM CONNECTED WITH THE LIFTING OR TRAVERSE RAILS OF FLY FRAMES.
No. 485,171. Patented Nov. 1, 1892.
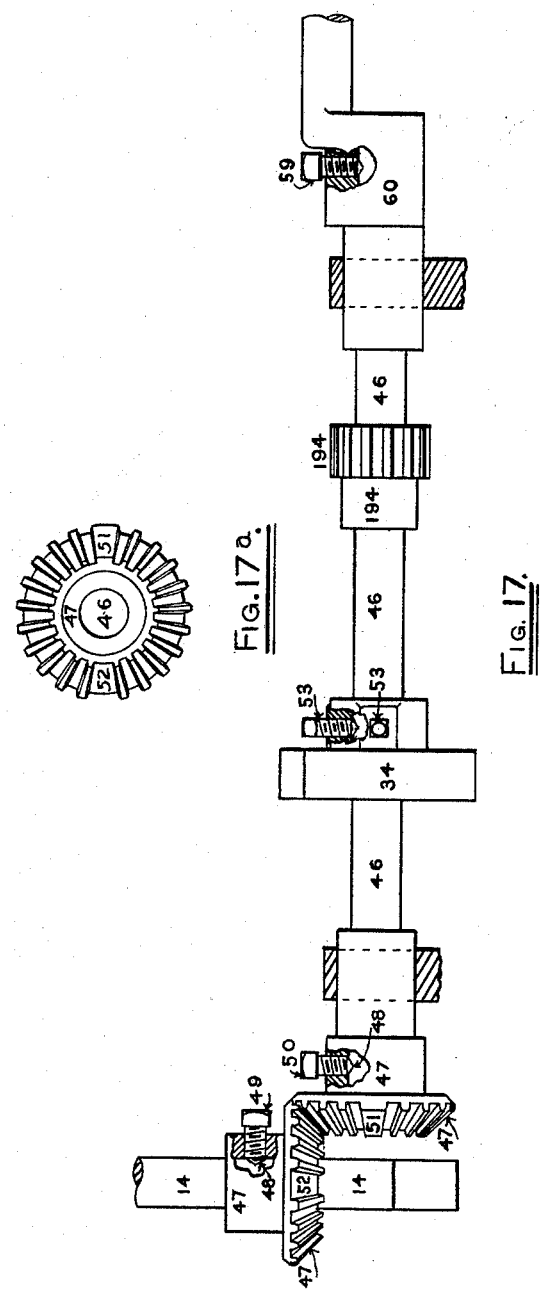
WITNESSES.
INVENTOR.

(No Model.) 20 Sheets—Sheet 8.

W. P. CANNING.
MECHANISM CONNECTED WITH THE LIFTING OR TRAVERSE RAILS OF FLY FRAMES.

No. 485,171. Patented Nov. 1, 1892.

WITNESSES.
Channing Whitaker.
Saml. G. Stephens.

INVENTOR.
William Pitt Canning.

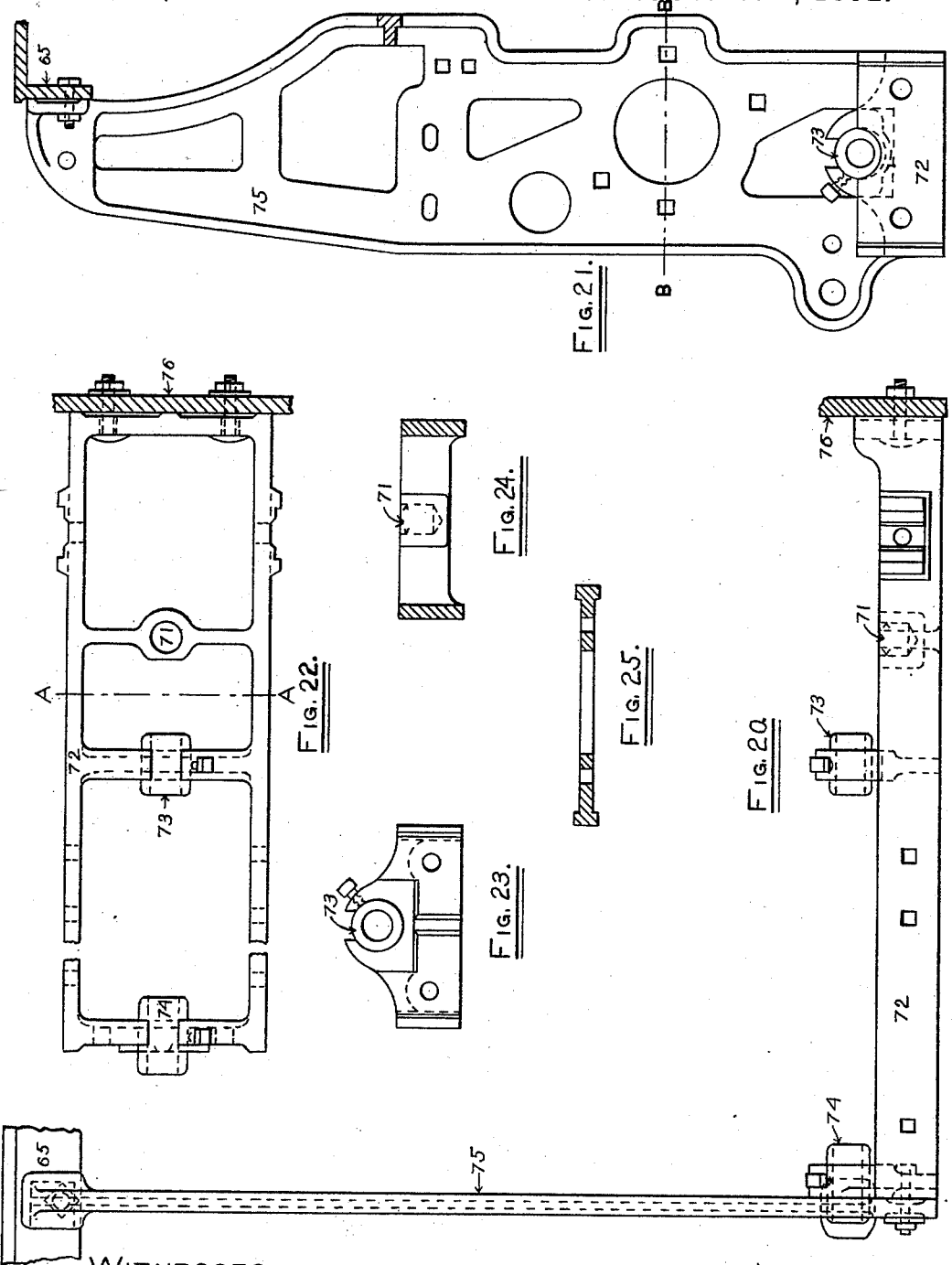

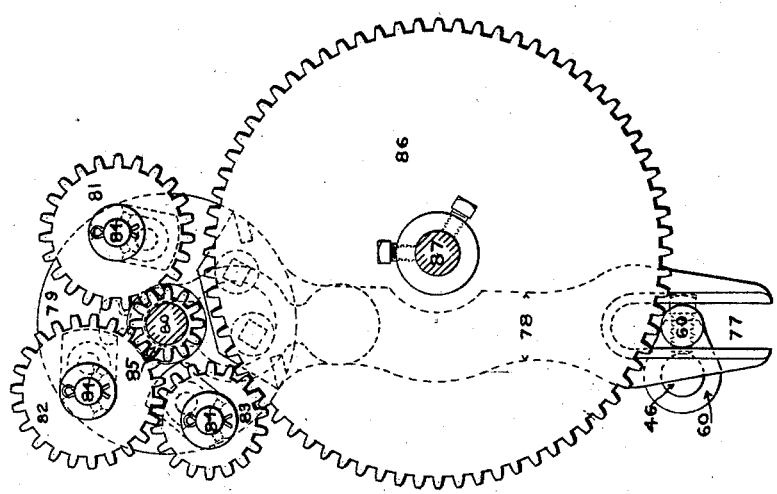
(No Model.)　　　W. P. CANNING.　　20 Sheets—Sheet 10.
MECHANISM CONNECTED WITH THE LIFTING OR TRAVERSE RAILS OF FLY FRAMES.
No. 485,171.　　　Patented Nov. 1, 1892.
WITNESSES　　　　　　　　　　　　　　　INVENTOR.

(No Model.)  20 Sheets—Sheet 11.
W. P. CANNING.
MECHANISM CONNECTED WITH THE LIFTING OR TRAVERSE RAILS OF FLY FRAMES.
No. 485,171. Patented Nov. 1, 1892.
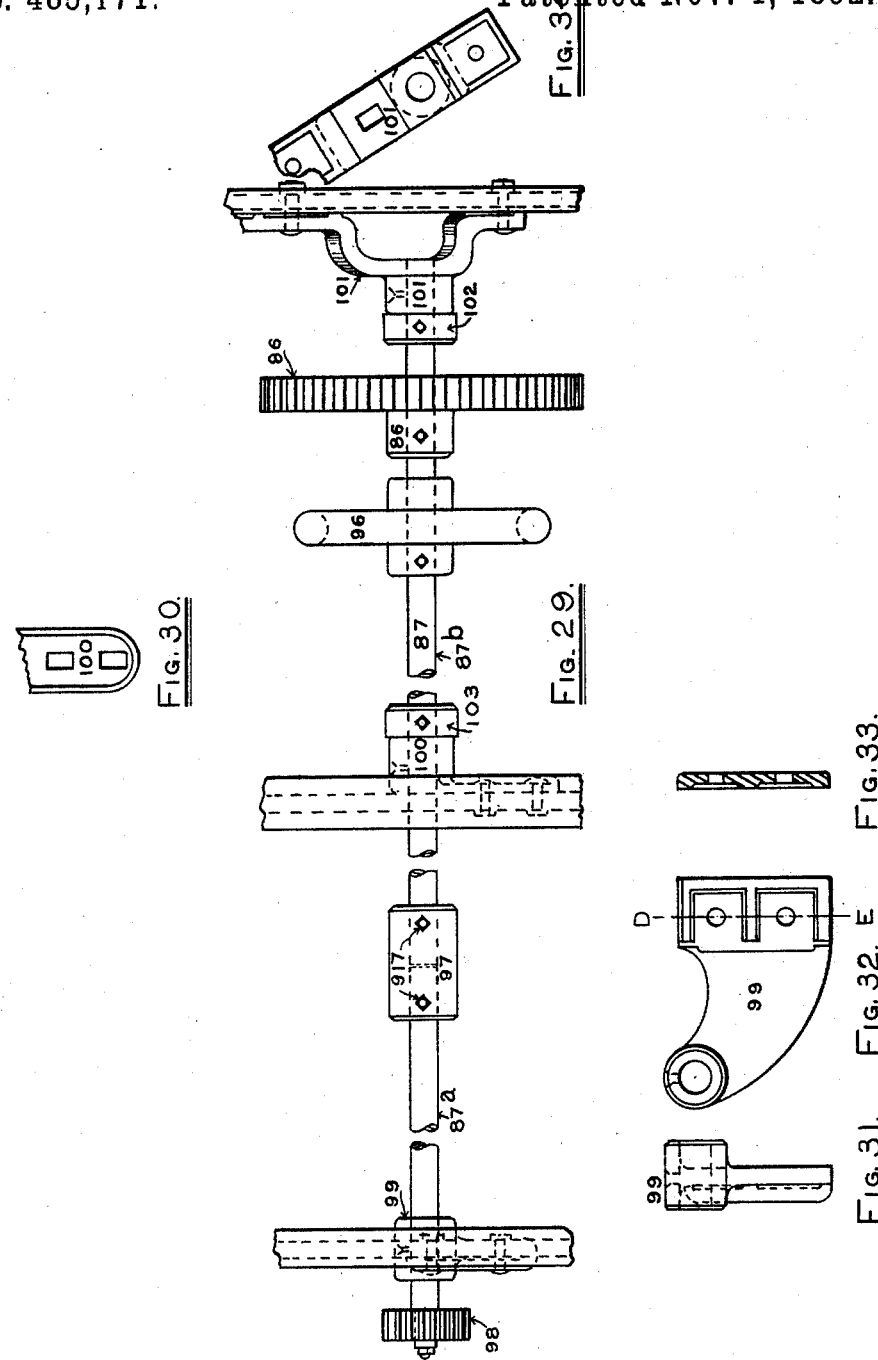
WITNESSES.  INVENTOR.

(No Model.)
20 Sheets—Sheet 12.
W. P. CANNING.
MECHANISM CONNECTED WITH THE LIFTING OR TRAVERSE RAILS OF FLY FRAMES.
No. 485,171.
Patented Nov. 1, 1892.
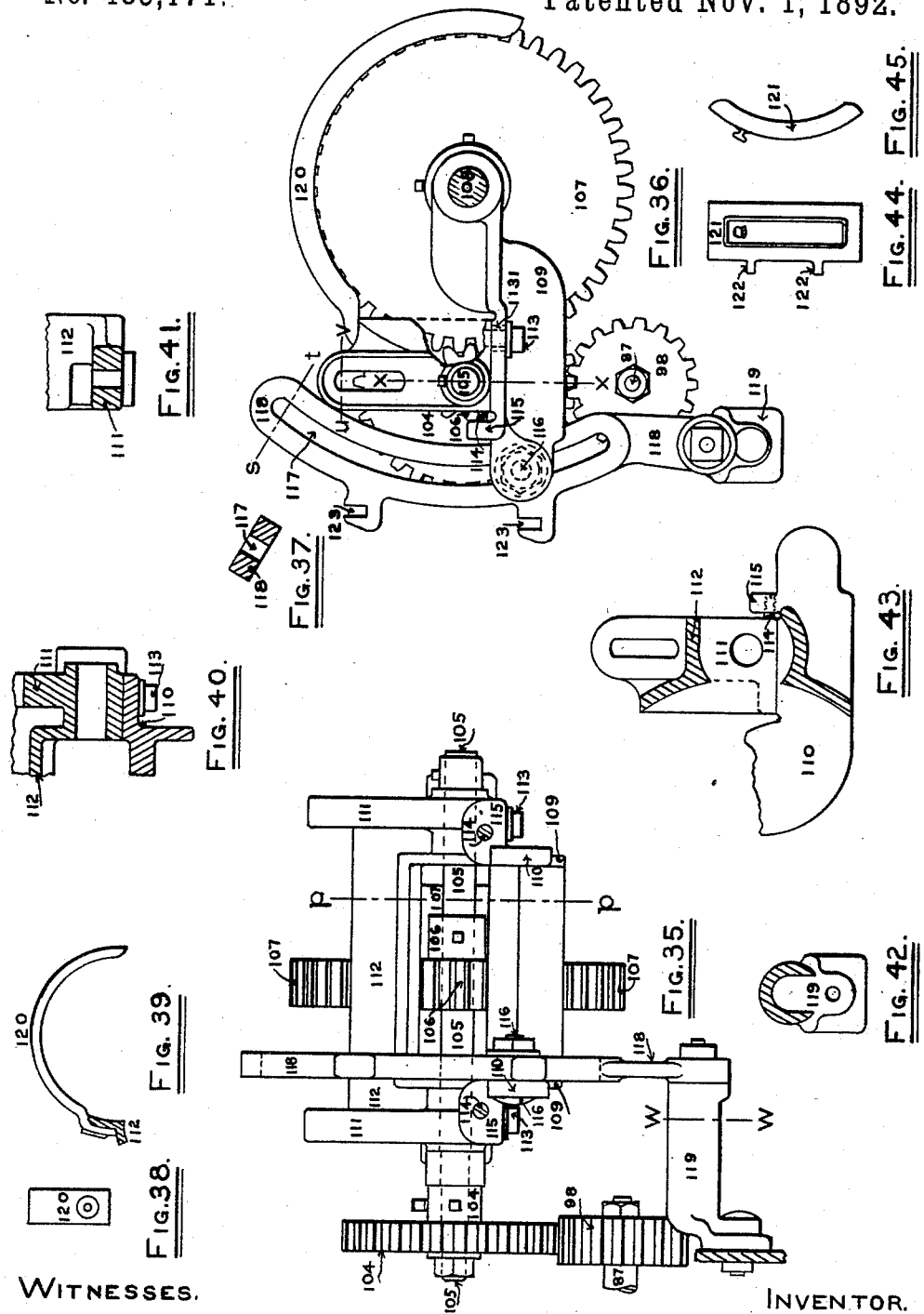
WITNESSES.
Channing Whitaker.
Saml. G. Stephens.
INVENTOR.
William Pitts Canning.

(No Model.)

20 Sheets—Sheet 13.

W. P. CANNING.
MECHANISM CONNECTED WITH THE LIFTING OR TRAVERSE RAILS OF FLY FRAMES.

No. 485,171.

Patented Nov. 1, 1892.

WITNESSES:
Channing Whitaker
Saml G. Stephens

INVENTOR
William Pitt Canning

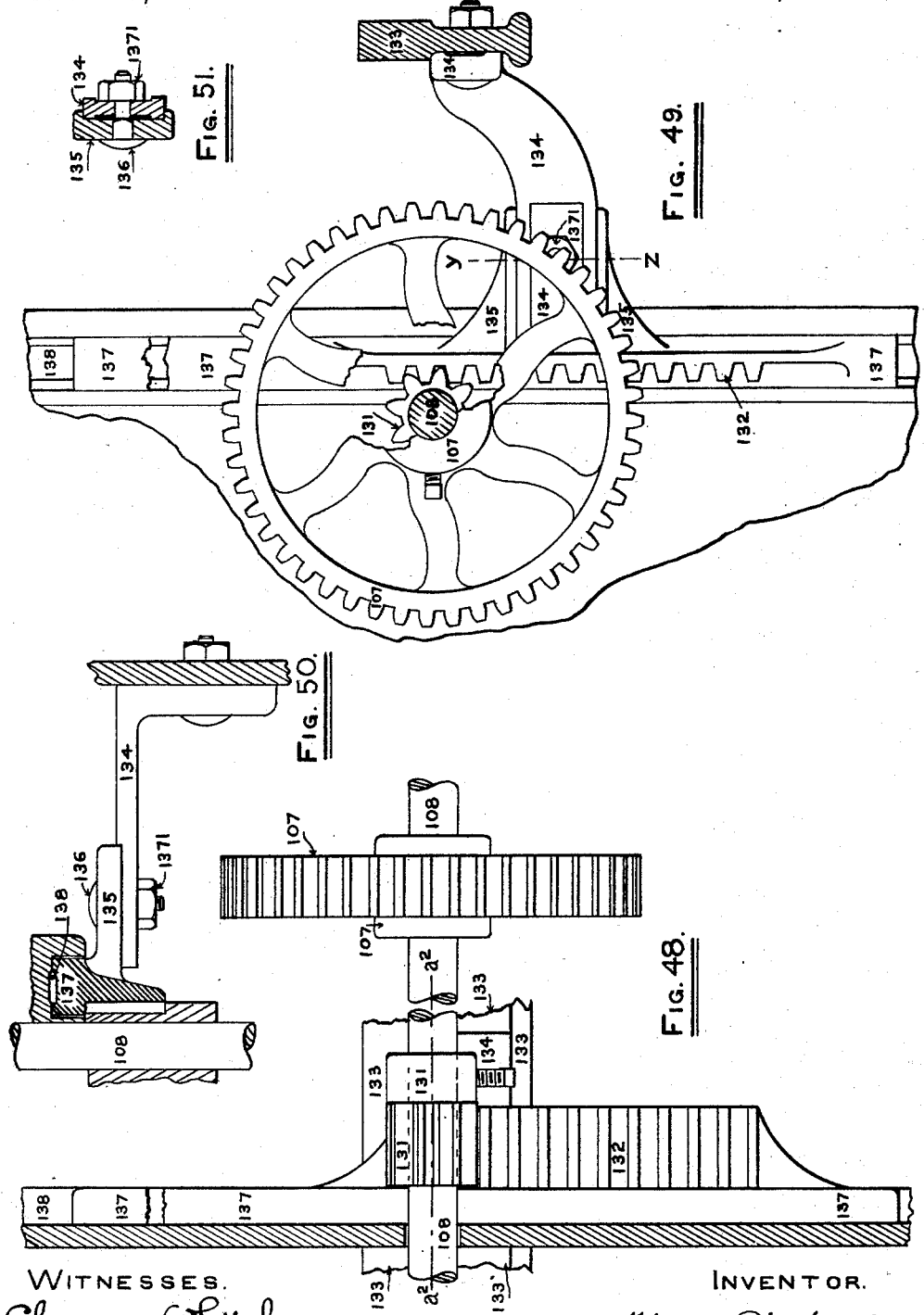

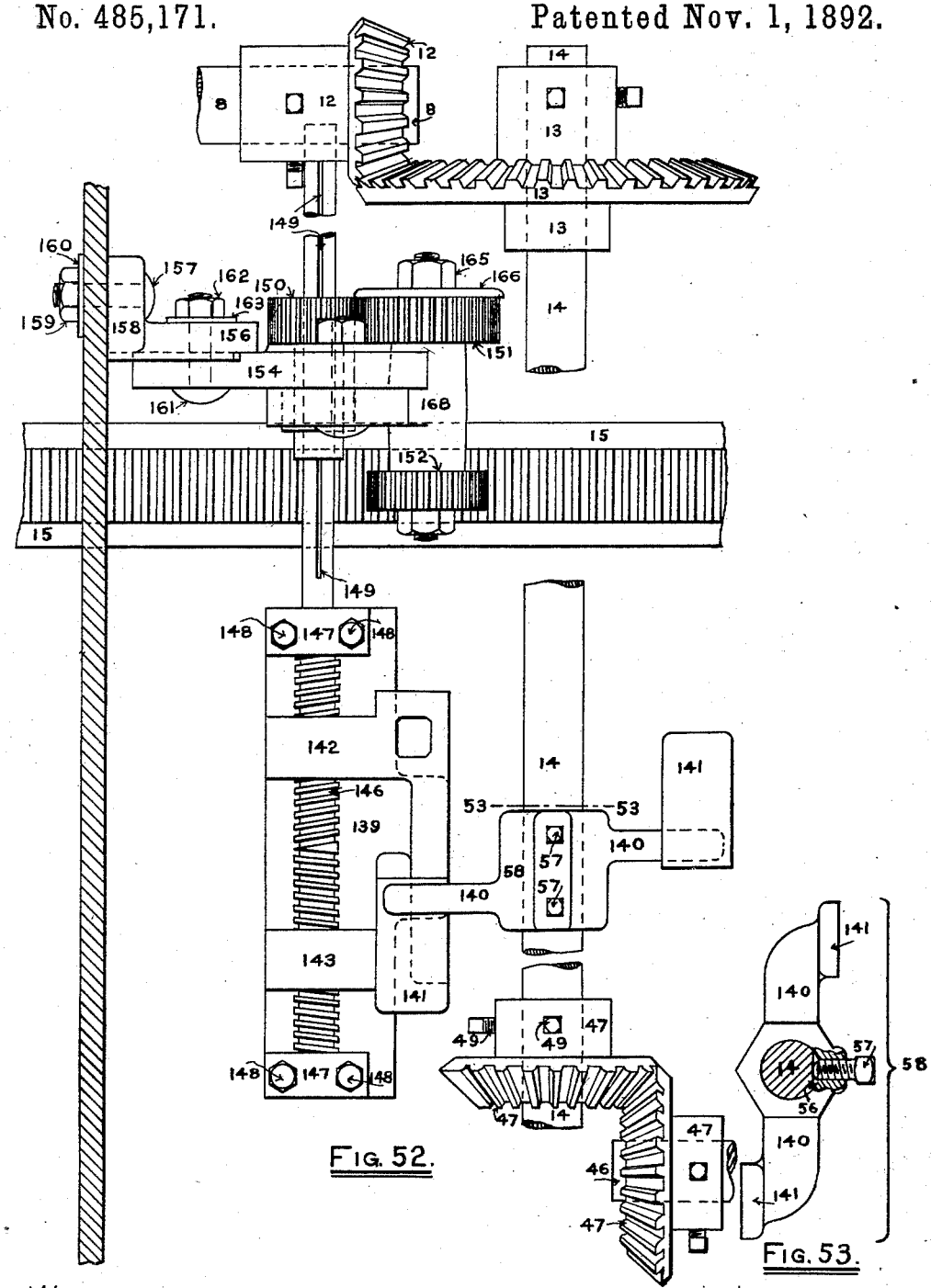

(No Model.) 20 Sheets—Sheet 17.

W. P. CANNING.
MECHANISM CONNECTED WITH THE LIFTING OR TRAVERSE RAILS OF FLY FRAMES.

No. 485,171. Patented Nov. 1, 1892.

WITNESSES.
Channing Whitaker.
Saml. G. Stephens.

INVENTOR.
William Pitt Canning.

(No Model.) 20 Sheets—Sheet 18.
W. P. CANNING.
MECHANISM CONNECTED WITH THE LIFTING OR TRAVERSE RAILS OF FLY FRAMES.
No. 485,171. Patented Nov. 1, 1892.
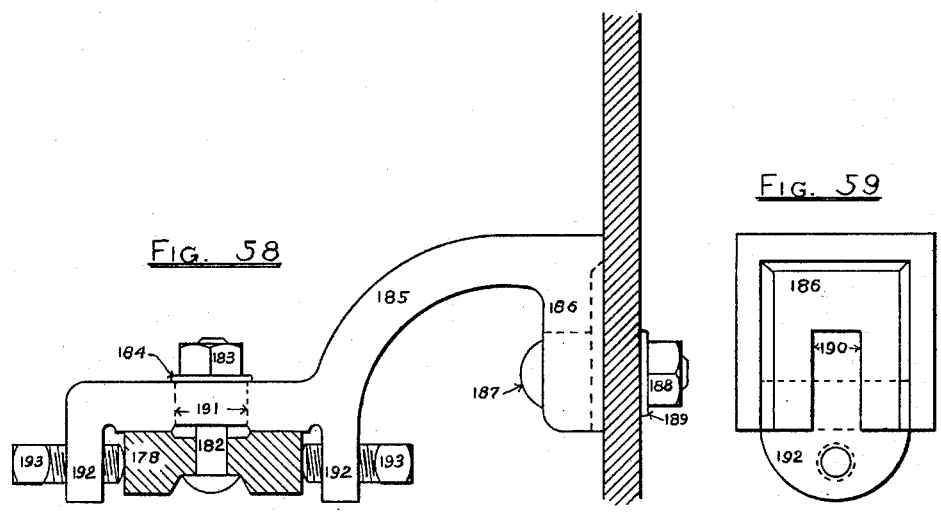
WITNESSES
INVENTOR

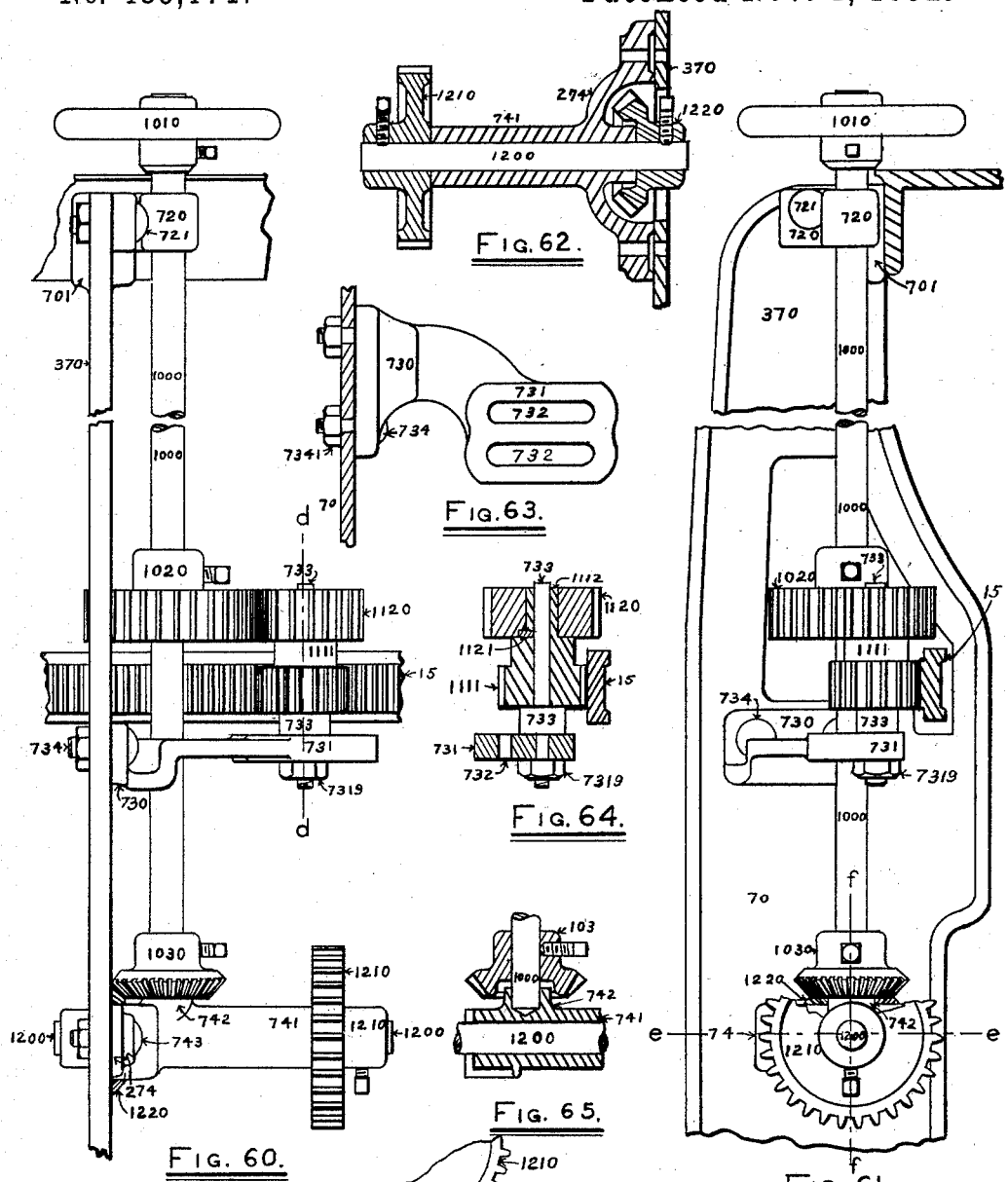
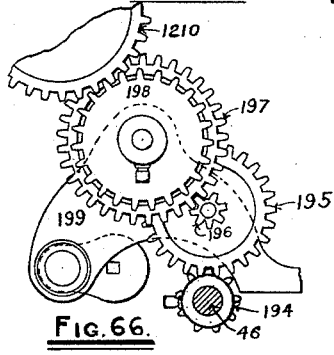

(No Model.) 20 Sheets—Sheet 20.
W. P. CANNING.
MECHANISM CONNECTED WITH THE LIFTING OR TRAVERSE RAILS OF FLY FRAMES.
No. 485,171. Patented Nov. 1, 1892.
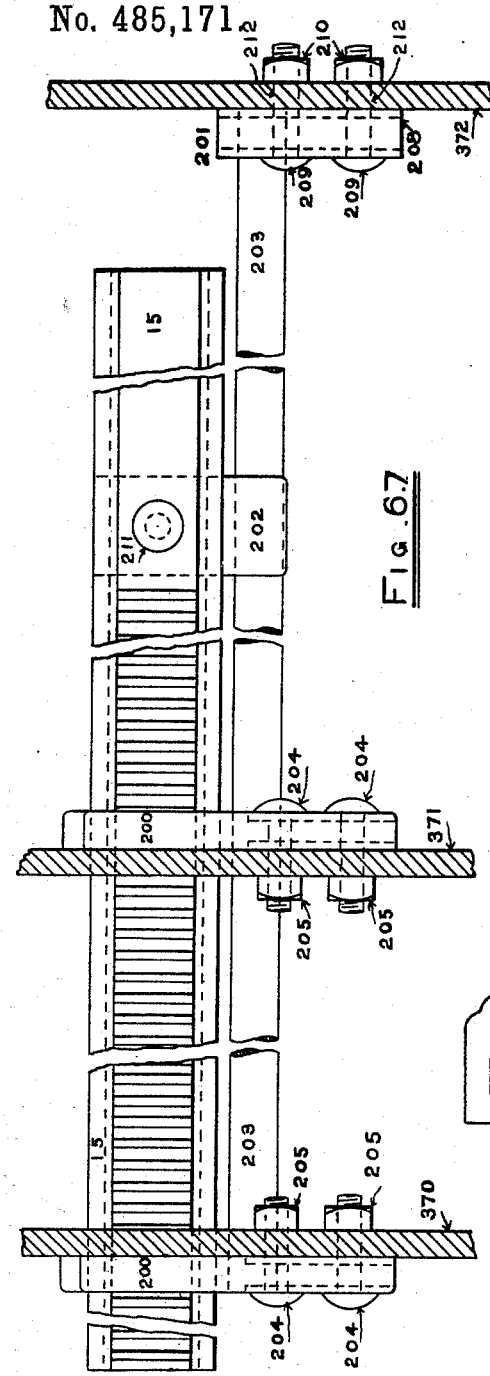
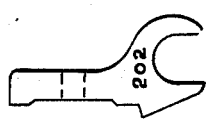
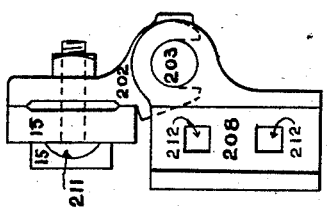
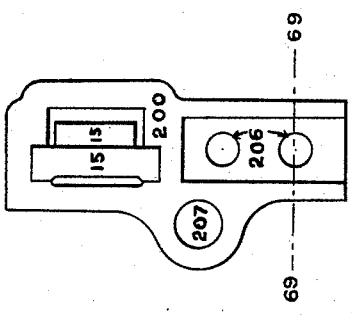
WITNESSES.
Channing Whitaker.
Sam¹. G. Stephens.
INVENTOR
William Pitt Canning.

UNITED STATES PATENT OFFICE.

WILLIAM PITT CANNING, OF LOWELL, MASSACHUSETTS, ASSIGNOR TO THE LOWELL MACHINE SHOP, OF SAME PLACE.

MECHANISM CONNECTED WITH THE LIFTING OR TRAVERSE RAILS OF FLY-FRAMES.

SPECIFICATION forming part of Letters Patent No. 485,171, dated November 1, 1892.

Application filed July 8, 1892. Serial No. 439,377. (No model.)

*To all whom it may concern:*

Be it known that I, WILLIAM PITT CANNING, a citizen of the United States, residing at Lowell, in the county of Middlesex and Commonwealth of Massachusetts, have invented certain new and useful Improvements in Mechanisms Connected with the Lifting or Traverse Rails of Fly-Frames, of which the following is a specification, reference being had therein to the accompanying drawings.

My invention relates to spinning-machines of the class known as "fly-frames," and comprises various improvements in the mechanism of such machines, particularly in those parts of the said mechanism which are concerned in communicating proper movements to the lifting or traverse rail, although the said improvements affect, also, other and connected parts of the said mechanisms.

The invention will first be described with reference to the accompanying drawings, and then be particularly pointed out in the claims at the close of this specification.

Figure 2:
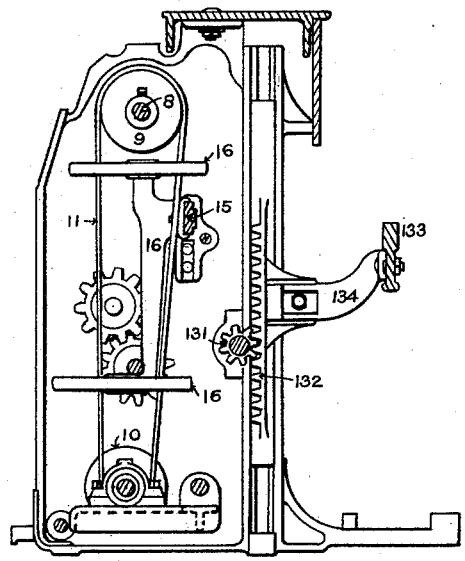
Figure 3:
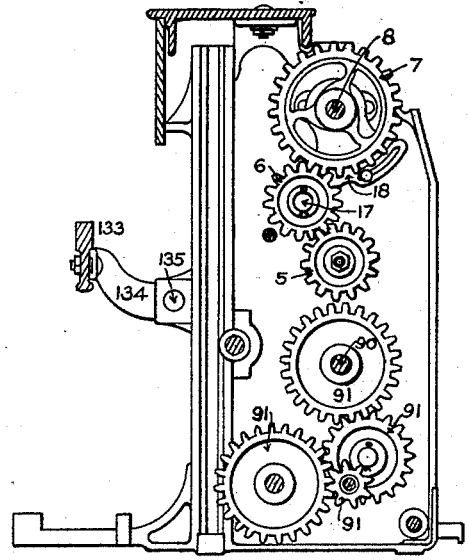
Figure 4:
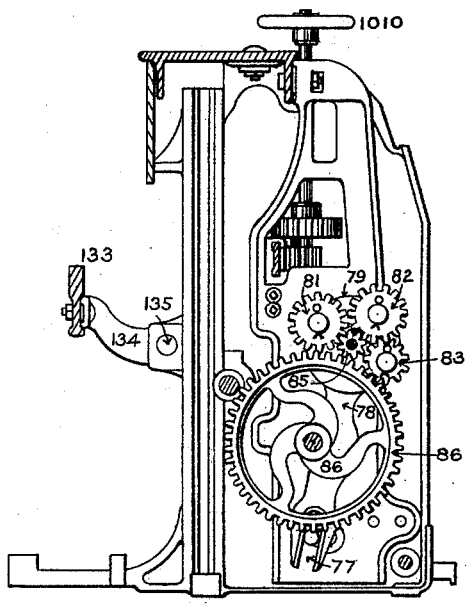
Figure 5:
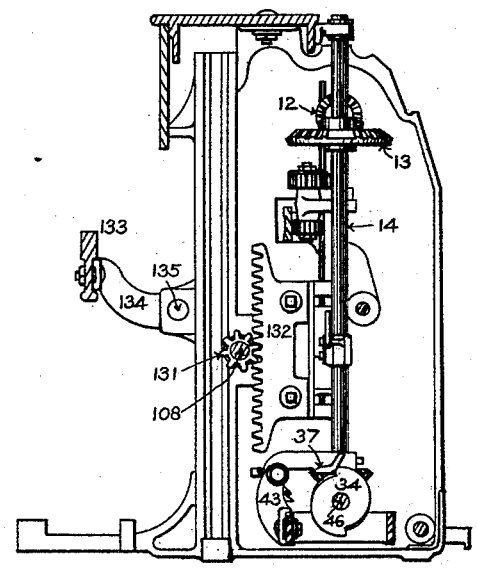
Figure 7:
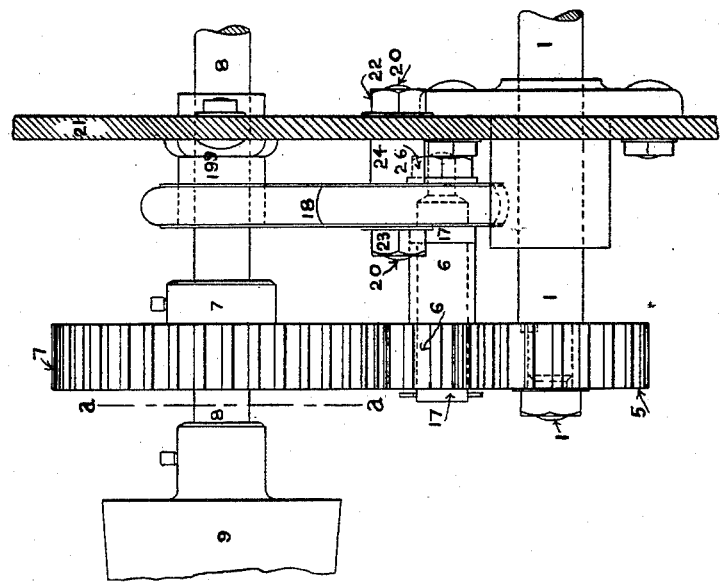
Figures 8, 9:
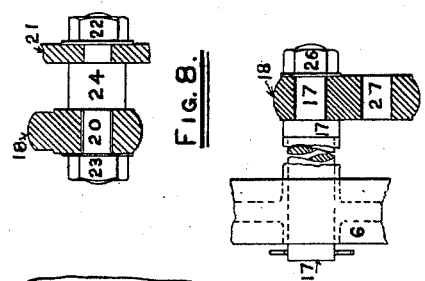
Figure 6:
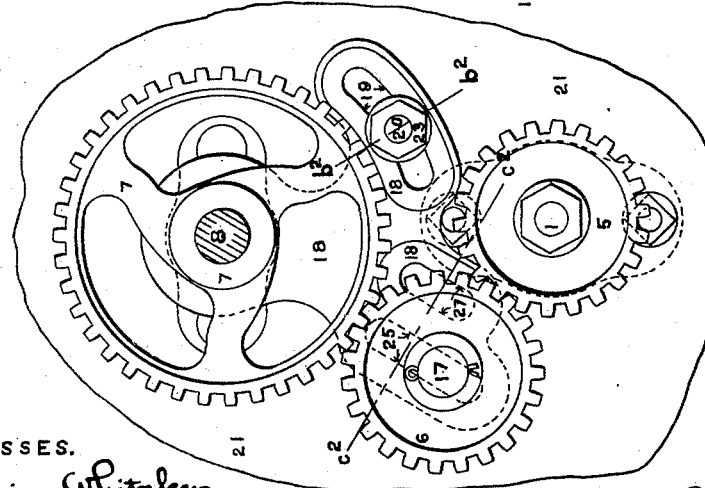
Figure 10:
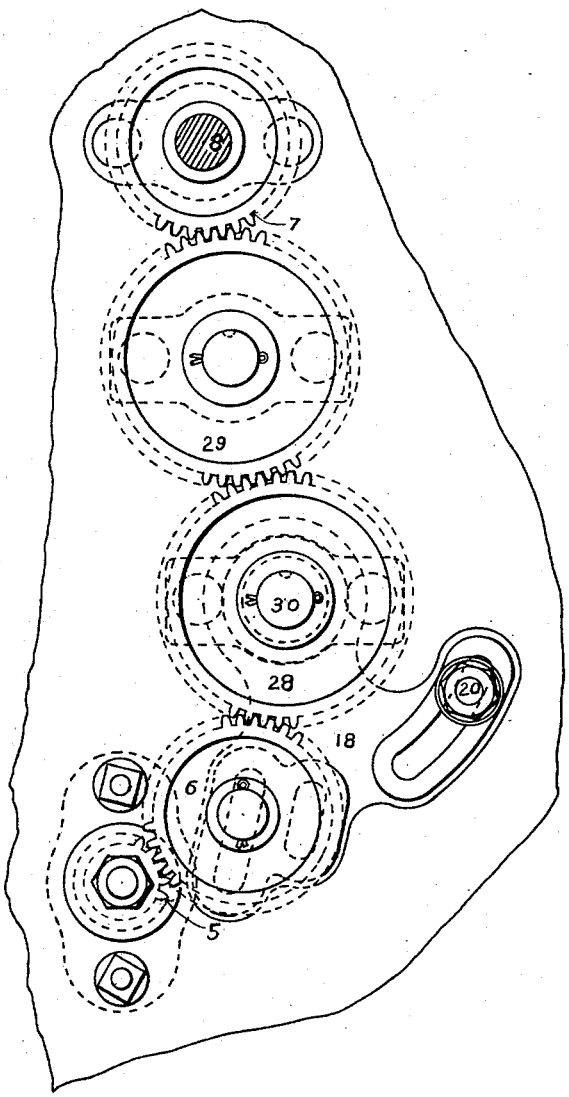
Figure 18:
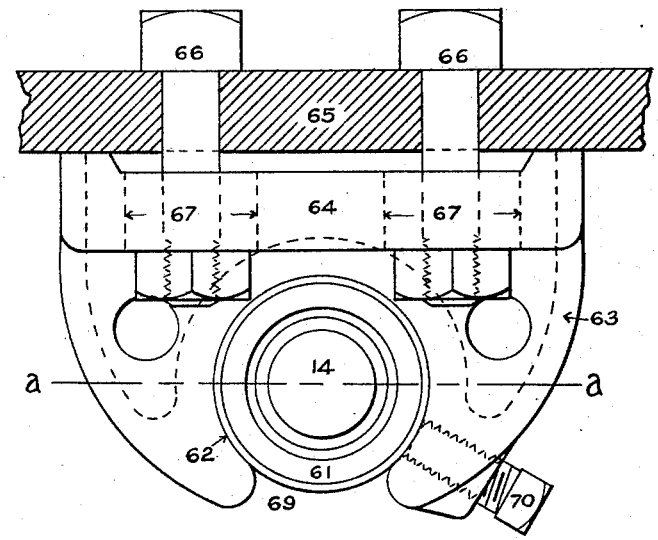
Figure 19:
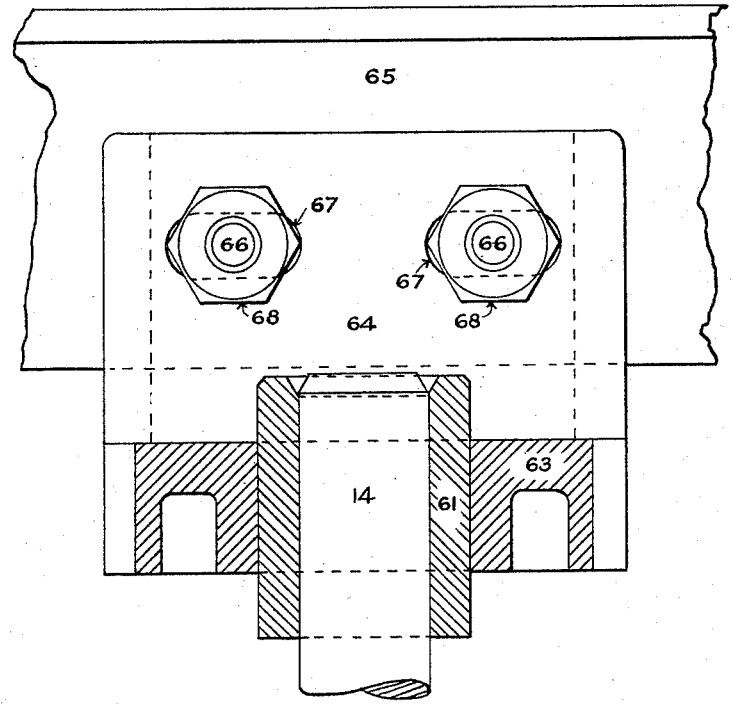
Figure 47:
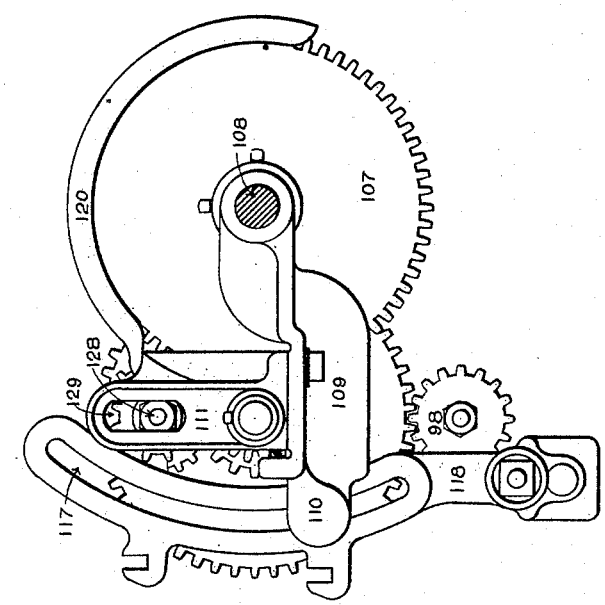
Figure 46:
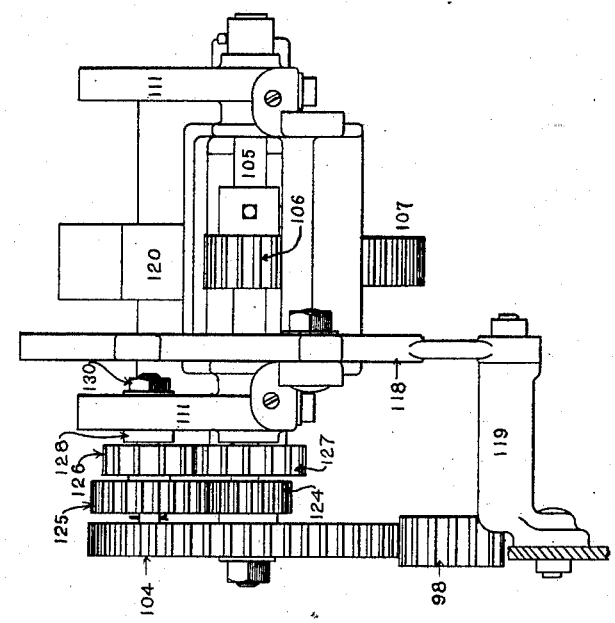
Figure 54:
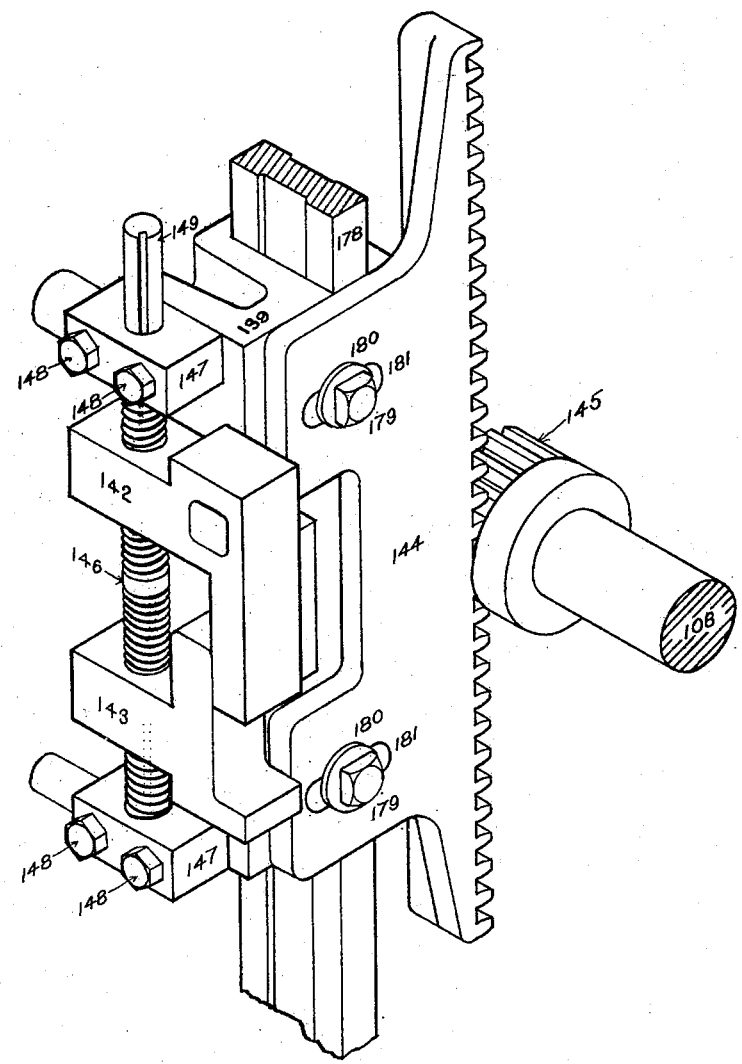
Figure 56:
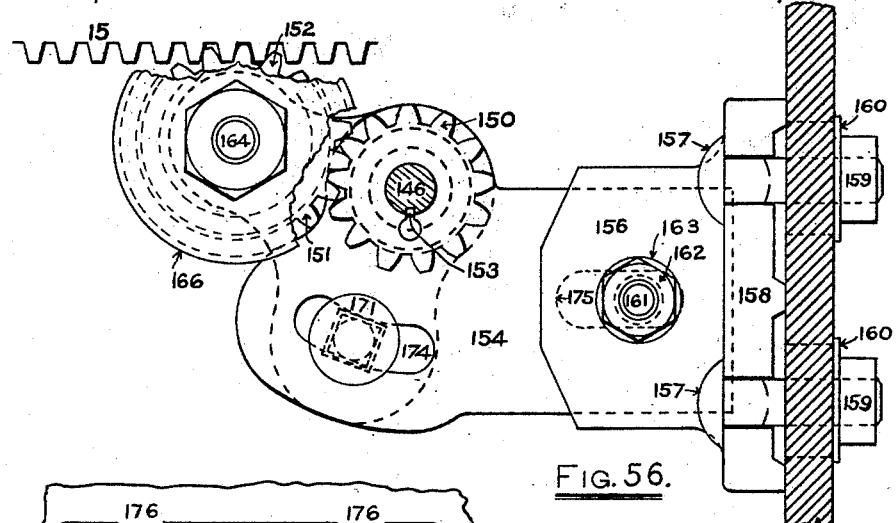
Figure 57:
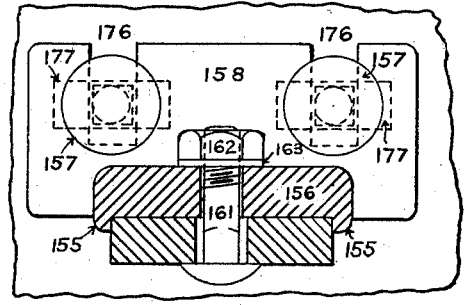
Figure 55:
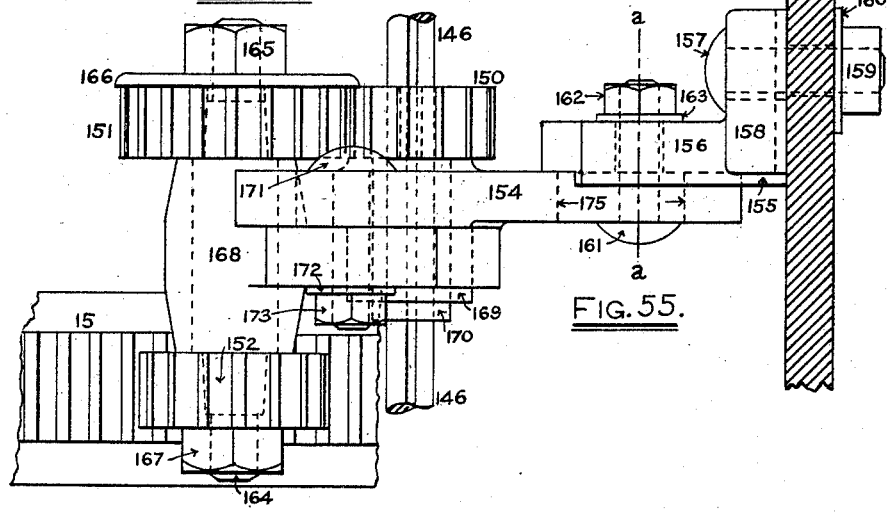

In the accompanying drawings, Figure 1 is a view in rear elevation of a portion of a fly-frame, it representing only certain portions of the framing and the main operating mechanism of the fly-frame and showing the application and relations of the features of my present invention. Fig. 2 is a view in vertical section on the line *a a* in Fig. 1, looking toward the left in the latter figure. Fig. 3 is a view in vertical section on the line *a a* in Fig. 1, looking toward the right in the latter figure. Fig. 4 is a view in vertical section on the line *c c* in Fig. 1, looking toward the right in the latter figure. Fig. 5 is a view in vertical section on the line *b b* in Fig. 1, looking toward the right in the latter figure. Figs. 6 and 7 are side and edge views, respectively, showing one arrangement of change-gearing through which the upper cone-shaft is driven from the main driving-shaft. Figs. 8 and 9 are views in section on the lines $b^2 b^2 c^2 c^2$, respectively, in Fig. 6. Fig. 10 is a view showing in side elevation a modified arrangement of the change-gearing between the upper cone-shaft and the main driving-shaft. Fig. 11 is a view showing a part of the segment-gear at the upper end of the tumbling-shaft and also showing the said shaft in section. Fig. 12 is a view, mostly in side elevation, showing the upper end of the tumbling-shaft and the segment-gear mounted thereon, the adjacent end of the upper cone-shaft, the gear-wheel mounted thereon, and the bearing for the said end of the upper cone-shaft. Fig. 13 is a view in section on the line M M in Fig. 12, looking toward the right-hand side in the latter. Fig. 14 is a view showing in side elevation the starting or impulse devices for communicating to the tumbling-shaft the starting impulses which place the segments of teeth on the gear-wheel at the upper end thereof in engagement with the teeth of the driving-gear carried by the upper cone-shaft. In this figure the reverse shaft and the framing are shown in section. Fig. 15 is a view showing in plan the devices which are shown in Fig. 14. Fig. 16 is a view in section on the line 16 16 of Fig. 15. Fig. 17 is a view, partly in section, showing in side elevation the reverse shaft, the parts carried thereby, the lower end of the tumbling-shaft, and the gear-wheels by means of which the said shafts are caused to rotate in unison. Fig. 17ª is a view of one of the gap-gears hereinafter described. Figs. 18 and 19 are views, each partly in section, illustrating the upper end of the tumbling-shaft and the adjustable and removable bearing therefor. Figs. 20 to 25 are views illustrating the reverse stand and the portions of the machine-framing with which said stand is connected. Figs. 26 and 27 are views showing, mainly, the tumbler-head and adjacent parts of the reversing mechanism forming part of the traverse mechanism for the lifting or traverse rail. Fig. 28 is a view in section on the line 28 28 of Fig. 27, looking toward the left-hand side in the latter figure and showing, mainly, the keeper for the tumbler-head. Fig. 29 is a view showing the lay-shaft, its supports, and certain parts connected with said shaft. Fig. 30 is a view in side elevation of the foot portion of the intermediate bearing of the lay-shaft. Figs. 31 and 32 are views in end and side elevation, respectively, of the bearing for the lay-shaft, which is shown at the left in Fig. 29. Fig. 33 is a view in vertical section on the line D E in Fig. 32. Fig. 34 is a view in end elevation of the bearing for the lay-shaft, which is shown at the right of Fig. 29. Figs. 35 and 36 are views of the rail-link and other parts of the center lifting devices, the said figures showing one arrangement of the gearing which may be employed for transmitting motion from the lay-shaft to the lifting-shaft. Fig. 37 is a view in section on the line $s\,t$ in Fig. 36. Figs. 38 and 39 are views showing the cover for the main lifting-gear. Fig. 40 is a view in vertical section on the line $x\,x$ in Fig. 36. Fig. 41 is a view in horizontal section on the line $u\,v$ in Fig 36. Fig. 42 is a view in vertical section on the line $w\,w$ in Fig. 35. Fig. 43 is a view in section on line $p\,p$, Fig. 35, looking to the right in said figure. Fig. 44 and 45 are front and edge views, respectively, of a cover for the gears 98 and 104. Figs. 46 and 47, respectively, are views corresponding to Figs. 35 and 36, but showing a different arrangement of gearing. Figs. 48 and 49 are sectional views illustrating, mainly, a part of the lifting or traverse rail, a portion of the lifting-shaft, the main lifting-gear, and the connections through which the said rail is operated from the said shaft. Fig. 50 is a view in horizontal section on the line $a^2\,a^2$ in Fig. 48. Fig. 51 is a view in vertical section on the line $y\,z$ in Fig. 49. Fig. 52 is a view showing in elevation a part of the upper cone-shaft, the tumbling-shaft, the tumbling-dog, a part of the reverse shaft, the connecting-gears, the taper-motion head and screw, part of the main rack, and certain intermediate gearing, whereby the said screw is rotated from said rack. Fig. 53 is a view in horizontal section on line 53 53 in Fig. 52. Fig. 54 is a perspective view of the taper-motion head, its rack and guide bar, the taper-motion screw, the lifting-shaft, and the gear carried thereby, which engages the rack on the taper-motion head. Figs. 55, 56, and 57 are views, partly in section, illustrating the gears whereby the taper-motion screw is rotated from the rack and the stand for supporting the said gears and maintaining the taper-motion screw in a vertical position. Figs. 58 and 59 are views, the former partly in section, of the devices for supporting and adjusting the upper end of the taper-motion guide-bar. Figs. 60 and 61 are views illustrating a portion of the devices through which the cone-rack is moved endwise to shift the cone-belt. Fig. 62 is a view in horizontal section on the line $e\,e$ of Fig. 61. Fig. 63 is a view, partly in section, showing the middle wind-up stand in plan. Fig. 64 is a view in vertical section on the line $d\,d$ of Fig. 60. Fig. 65 is a view in vertical section on the line $f\,f$ of Fig. 61. Fig. 66 is a view showing the so-called "tension-gearing," intermediate the reverse shaft and the wind-up shaft. Fig. 67 is a view showing the cone-rack and its supports and guides. Fig. 68 is a view of one of the guides, showing the rack in place therein. Fig. 69 is a view in section on the line 69 69 of Fig. 68. Fig. 70 is a view showing in elevation the rack, the saddle fixed thereto, the guide-rod on which said saddle rests and slides, and the supporting-stand for one end of the said rod. Fig. 71 is a plan view of the said stand. Fig. 72 is a view in side elevation of the said saddle.

In the drawings, (see particularly Fig. 1,) 1 is the driving-shaft of a fly-frame, while 2 and 3, respectively, are the fast and loose pulleys thereon, and 4 is the fly-wheel. As shown, also, in Figs. 3, 6, and 7, a gear 5 at the inner end of the driving-shaft 1, known in the art as the "twist-gear," meshes with a carrier 6, known as the "twist intermediate," which in turn meshes with a gear 7, known as the "upper twist-gear," on the shaft 8 of the upper cone 9.

At 10, Figs. 1 and 2, is shown the lower cone, and at 11 the cone-belt.

At 12, Figs. 1, 5, and 12, is a bevel-gear at one end of the shaft 8 of the upper cone, and 13 is a segment bevel-gear having oppositely-located gaps 31 among the teeth thereof and mounted on the tumbling-shaft 14, the said gear 13 being engaged by the bevel-gear 12.

At 15, Figs. 1, 60, 61, and 67, is shown the cone-rack, it carrying the cone-belt guide 16, and being operated from the tumbling-shaft 14 through devices hereinafter to be described, so as to be moved gradually endwise to shift the cone-belt along the cone-pulleys. The twist-gear 5 is a change-gear, and hence the twist intermediate 6 is mounted in a manner to permit it to be shifted as may be necessary in order to compensate for the substitution of twist-gears of different dimensions.

In Figs. 6, 7, 8 and 9 I have shown a convenient arrangement for supporting said twist intermediate 6. The stud 17, on which gear 6 turns, is shown in these figures carried by a plate 18, which is known as the "twist-link," the said plate or link 18 being mounted upon the bearing 199 for the upper cone-shaft 8, with capacity for swinging thereon concentrically with the said shaft, and being formed with a curved slot 19, also made concentric with the shaft 8, through which projects a bolt 20, held to the machine-framework 21 by a nut 22, and provided with a nut 23, between which and the shoulder at the outer end of the enlarged body 24 of the said bolt 20 the said plate or link 18 is clamped when the nut 23 is turned up.

At times it is desired to make greater change than usual in the capacity and operation of the machine, which is effected by replacing the upper twist-gear 7 by one of different dimensions. In order to permit this change, the plate 18 is formed with a slot 25, made radial to the shaft 8, and along which slot the stud 17 may be adjusted, the said stud being secured in the proper position of adjustment in the said slot by the nut 26. (Shown in Fig. 9.)

In certain fly-frames it sometimes becomes necessary to employ a very small twist-gear 5, and then it is found convenient, in order to provide for holding the intermediate gear 6 properly in mesh with gears 5 and 7, to form the link 18 with a supplemental slot 27, to which the stud 17 may be transferred. In high machines the upper cone-shaft 8 is so far above the driving-shaft 1 as that additional intermediates 28 and 29 must be employed, as shown in Fig. 10. In this case the plate 18 is mounted, as shown in Fig. 10, to swing around the stud 30, that supports the intermediate 28.

As will be understood, when the continuously-rotating gear 12 is in engagement with the teeth of the segment-gear 13 it rotates the latter and the tumbling-shaft 14 until one of the oppositely-located gaps 31 in the teeth of the segment-gear (see Fig. 11) presents itself to the teeth of the gear 12, whereupon the rotation of the segment-gear and tumbling-shaft is arrested, the said parts being held stationary until the tumbling-shaft is given a slight advance sufficient to bring the teeth of the segment-gear 13 again into mesh with those of the gear 12, the said segment-gear completing a half-revolution before stopping with the gear 12 over the opposite gap.

Inasmuch as it sometimes occurs in practice that in coming again into mesh the points of the teeth of the wheels 12 and 13 may interfere, I provide means which will save the parts from the breakage which would be likely to occur. This means is shown in Figs. 12 and 13, in which figures the opening 33 within the pipe-bearing 32 for the end of the shaft 8, on which is mounted the gear 12, instead of being cylindrical, is vertically elongated, so as to leave the shaft 8 free to rise therein. Normally the shaft 8 rests in the lower portion of this hole or opening; but when the teeth of gear 12 strike or override the said shaft is permitted to move upward, thus obviating breakage.

For the purpose of imparting to the tumbling-shaft 14 the impulse or advance which carries the gear 13 around far enough to move the gap 31 from beneath the gear 12 and place the first teeth of one of the series of teeth on the gear 13 in engagement with the teeth of the gear 12 it is usual in practice to combine with the shaft 14 spring-pressure or starting devices, which when the said shaft is brought to a state of rest at the completion of each movement of partial revolution thereof are left in a state of tension, so as that when the said shaft is freed from the restraint of the devices which control the times of rotation thereof the said spring-pressure devices shall immediately come into play, with the effect of giving to the tumbling-shaft a sufficient movement to carry the teeth of one of the segments of the gear 13 into mesh with those of gear 12. I have devised an improved form of the said spring-pressure devices, the same being clearly illustrated in Figs. 14, 15, and 16 of the drawings. In Figs. 14 and 15, 34 is a cam-disk having on its periphery two risers or noses 35, having abrupt but rounded ends, as shown. Against the periphery of the cam 34 bears the angular end portion 36 of an arm 37, the said arm being pivotally mounted upon a stud 38 and acted upon by a spiral spring 39, one end of which bears against the projection 40, forming part of the arm 37, while the other end thereof engages with the collar 41, mounted upon the stud 38, and held in place thereon by the set-screw 42, the said end of the spring thereby reacting against the stud. The stud 38 passes through a hole in a supporting-arm 43, and is held in place therein by a set-screw 44, passing through a threaded hole in said arm and taking bearing against the side of the stud, as clearly shown in Fig. 16. The tension of the spring 39 may be varied as desired by loosening the set-screw 44, turning the stud 38 on its axis by means of a suitable tool applied to the head 45 of the stud, which is polygonal or otherwise suitably-shaped for the purpose, and tightening the screw 44 again.

The cam 34, if desired, may be applied directly to the tumbling-shaft 14; but I prefer, as in the machine illustrated in the drawings, to apply the said cam to a supplemental shaft 46, (see Figs. 1, 5, and 17,) herein shown placed in a horizontal position and geared to the tumbling-shaft 14 by a pair of miter-gears 47 47. (See particularly Figs. 1 and 17.) The shaft 46 I term the "reverse-shaft," inasmuch as it is utilized for occasioning the successive reverses in the direction of the movement of the lifting or traverse rail 133, as will hereinafter be made clearly to appear. When the cam 34 is mounted upon the said shaft 46, it is convenient to make provision for enabling the parts to be accurately and readily assembled, either in originally setting up the machine or after making repairs therein. The utility of such a provision will be apparent when it is borne in mind that it is by the pressure of the inclined face at the end of the arm 37 against the apex of a nose or riser on the cam 34 that during the time that the tumbling-shaft should remain stationary the said shaft is held with a gap 31 of its wheel 13 presented opposite to the teeth of the gear 12, and also with the working face of one of the arms of the tumbling-dog 58 (see Fig. 52) carried by the tumbling-shaft 14, pressed firmly against the surfaces of the jaws 142 143, carried by the taper-motion head 139, as shown in the said Fig. 52.

The gear 13 and the tumbling-dog 58 are applied to the tumbling-shaft 14 in fixed predetermined positions, while the cam-disk 34 and crank 60, forming a part of the reversing devices for the lifting or traverse rail, similarly are applied to the shaft 46 in fixed predetermined positions. Thus, as shown in Figs. 11, 17, and 53, the shaft 14 is formed with flat places or holes 55 and 56 for the reception of the ends of the screws 54 and 57, which hold the gear 13 and tumbling-dog 58 in place on said shaft, and the shaft 46 is formed with similar holes for the reception of the set-screws 53 and 59, which secure the cam-disk 34 and crank 60. The said shafts 14 and 46 are also formed with holes 48 48 for the reception of the ends of the screws 49 and 50, by which the gears 47 47 are held in place on the said shafts.

Forming holes or recesses in the shafts 14 and 46, as described, for the reception of the ends of the securing-screws or "spotting" the said shafts, as it is called, enables the various parts mentioned to be secured on the said shafts in proper relative positions thereon without trouble or loss of time.

In order that in assembling the parts the same teeth of the gears 47 47 shall always be matched or placed together, I construct the said gears as shown in Figs. 17 and 17$^a$. In Fig. 17 the gear 47, carried by the shaft 46, is shown formed with a double tooth 51, while the gear 47, carried by the shaft 14, has a corresponding double space or gap 52 among its teeth. It will be obvious that in placing the gears 47 47 in mesh with each other the double tooth on one gear must be caused to enter the double space or gap on the other gear. For convenience in casting I sometimes make the gears 47 47 as illustrated in Fig. 17$^a$—namely, each with a double tooth 51 and a double space or gap 52, formed thereon at diametrically-opposite points, inasmuch as this enables me to use the same pattern in casting both wheels. The various parts mentioned may be fixed upon their shafts in the predetermined positions by other means than set-screws entering recesses in the shafts. For example, the gears, cam, crank, and tumbling-dog may be secured in place by pins passing through holes therein and in the shafts. The upper end of the shaft 14 has placed upon it a bearing shell or sleeve 61, which is fitted to an opening 62 in the horizontal flange 63 of the stand 64, the said stand being bolted to the beam 65 of the machine-framing by bolts 66, passing through the said beam and also through horizontal slots 67 in the stand 64, said bolts receiving nuts 68 upon their threaded ends. The slots 67 permit of lateral adjustment of the stand 64, such as may sometimes be found necessary in order to place the shaft 14 in correct position. The opening 62 is cylindrical and but slightly greater in diameter than the shell or sleeve 61, which is held in place therein by a clamping-screw 70. The horizontal flange 63 is formed with a gap 69 in the front portion thereof of such width that after the screw 70 has been turned to release the shell or sleeve 61 and the said shell or sleeve has been drawn upwardly above the flange 63 or off the end of the shaft 14 the said end of the shaft may be swung forward through the gap 69 clear of the stand 64, and, if desired, removed from the machine. The lower end of the shaft 14 is stepped at 71 (see Figs. 20, 22, and 24) in a cross-piece forming part of the reverse stand 72, the latter being provided with bearing-sleeves 73 and 74 for the support of the reverse-shaft 46. These sleeves 73 and 74 are supported and held in place by means substantially identical with those provided for the sleeve 61 at the upper end of the shaft 14, as clearly shown in Figs. 20, 21, 22, and 23. At one end thereof the reverse stand is bolted to the girt 75, (see Fig. 20,) which at its upper end is bolted to the beam 65, while at its other end said reverse stand is bolted to the samson or intermediate frame-piece 76. The pin of the crank 60 on the end of the reverse-shaft 46 enters the slot 77 in the lower end of the tumbler-arm 78, (see Figs. 26 and 27,) which at its upper end is bolted to the tumbler-head 79. The tumbler-head 79 is mounted upon the lay counter-shaft 80, so as to turn freely thereon, and carries three spur-pinions 81, 82, and 83, which are supported on studs 84, fixed to the said tumbler-head. Pinions 81 and 82 both mesh with the pinion 85, fixed upon the lay counter-shaft 80, which shaft has constant motion in one direction, but do not mesh with each other, while the pinion 83 meshes only with pinion 82.

At 86 is shown what I term the "reversing gear-wheel," it being mounted upon the shaft 87, which I term the "lay-shaft," and from which shaft 87 motion is communicated to the lifting-shaft 108 and lifting or traverse rail 133 through intermediate connections presently to be described. The shaft 80 at the end thereof opposite to that at which the tumbler-head is located (see Fig. 1) carries a gear 88, which meshes with a gear 89 on a shaft 90, known as the "compound pinion-shaft" (the compound pinion and connections not being shown in the present drawings.) The shaft 90 is driven from the shaft of the lower cone 10 through a train of gears 91 91 91 91 91. (See also Fig. 3.) As the reverse-shaft 46 is rotated intermittingly its crank 60 causes the tumbler-head 79 to rock, and thereby throws pinions 81 and 83 alternately into engagement with the reversing gear-wheel 86, thereby imparting movement to said gear 86 in opposite directions alternately. At times during the use of the machine it becomes necessary to change by hand the position of the lifting or traverse rail. To provide for permitting this, I make the tumbler-head 79 movable lengthwise of the shaft 80 and away from the reversing gear-wheel 86 toward the left in Fig. 27. When the tumbler-head has been thus moved to the left in said figure, its pinions are no longer in position to mesh with gear 86, and hence the lay-shaft and parts to and including the traverse rail may be moved by hand, by power applied to the hand-wheel 96, Figs. 1 and 29, on the lay-shaft. When the tumbler-head has been restored by hand to its former position, it is held in place by a keeper 93, which is interposed between the hub or boss of the tumbler-head and the bearing 92 for the adjacent end of the lay counter-shaft 80. The keeper 93 is shown most clearly in Fig. 28. It consists of a plate having formed therethrough a slot, which is narrow in its upper portion and enlarged in its lower portion. When the keeper is depressed, as shown in Figs. 27 and 28, the shaft 80 fits into the narrow portion 94 of the slot in the keeper, and the upper portion of the keeper prevents the tumbler-head from being moved to the left. When the keeper is raised, the hub or boss of the tumbler-head will be permitted to enter the enlarged portion 95 of the slot in the keeper, this permitting the tumbler-head to be moved to the left and its pinions to be withdrawn from position for engagement with the reversing-wheel 86.

The lay-shaft and certain of its connections are shown best in Figs. 29 to 33. In Fig. 29 I have shown the lay-shaft formed in two portions, 87$^a$ and 87$^b$, which are united by a coupling-sleeve 97, which incloses and is fastened by screws 917 917 to their adjacent ends. The portion 87$^b$ is shown as having mounted upon it the reversing-gear 86 and hand-wheel 96, while the portion 87$^a$ is shown as having mounted thereon the lay change-gear 98. I employ this two-part construction of lay shaft by preference in frames above the minimum length of frames for the following reasons: In the use of a fly-frame it becomes necessary at times to use different sizes of gears 98, and hence it is required that the end of the lay-shaft should be fitted for the application and removal of change-gears, the said end usually being formed with a tapering seat for the reception of the gear and a threaded portion for the reception of a locking-nut, and being provided with a steady-pin to compel the gear to rotate in unison with the shaft. In order to give the necessary construction to the said end of the lay-shaft, it is necessary to place the shaft in a lathe and operate upon it therein, which cannot always conveniently be done in the case of the long shafts, which would be required for fly-frames of the greatest lengths.

In order to avoid having to work in a lathe upon shafts of a considerable length, I proceed as follows: I provide sections 87$^a$ of a length corresponding with the lay-shaft, which will be used in the shortest fly-frame, fitting it at one end in the manner described for the reception of lay change-gears. I employ one of these sections 87$^a$ as the lay-shaft in a fly-frame of the shortest length, mounting thereupon the reversing gear-wheel 86 and hand-wheel 96, placing the same in the bearings 99, 100, and 101, and affixing thereupon the collars 102 103, adjacent to the bearings 100 and 101, for the purpose of preventing endwise movement of the same. For each fly-frame of a greater length I employ in addition to the section 87$^a$ a section 87$^b$ of suitable length for giving the necessary length of lay-shaft, forming the section 87$^b$ of plain shafting, applying thereto the gear-wheel 86, hand-wheel 96, and collars 102 103, mounting the same in the bearings 100 101, and uniting the same to the section 87$^a$ by the coupling 97. The bearing 99 is shown in front view in Fig. 31 and in side view in Fig. 32, while a view in section of the portion thereof which is bolted to the framing is given in Fig. 33. The foot of the bearing 100 is shown in Fig. 30, while in Fig. 34 is shown the bearing 101 and feet, whereby it is attached to the framing.

As shown in Figs. 1, 35, and 36, the lay-change-gear 98 meshes with the first lifter gear 104, which is mounted on a short shaft 105, carrying a pinion 106, meshing with the main lifter-gear 107, which last is mounted upon the lifting-shaft 108 at about the middle of the length thereof, this location of the said gear being adopted in order to avoid the irregularity in the movements of the lifting or traverse rail, which results from mounting the said gear near one end of the lifting-shaft. When the gear 107 is mounted near one end of the lifting-shaft, one end of the latter turns a little before the other end begins to turn, causing the lifting or traverse rail to move at one end before it does at the other.

In order to provide for the use of gears 98, differing in size, the shaft 105 is mounted on a support 109, which is movable toward and from the lay-shaft 87 around the axis of the lifting-shaft 108. This support I term the "rail-link," and it is formed with side portions 110 110, provided with bearings, which, as shown, are fitted to the shaft 108 on opposite sides of the gear-wheel 107. Upon the said side pieces are mounted bearing-pieces 111 111, containing bearings for the shaft 105, these bearings being fitted to the said shaft on opposite sides of the gear 106. These bearing-pieces 111 111 are shown connected by a bridging-piece 112, and the said bearing-pieces and bridging-piece collectively form what I term the "rail-link cap." The bearing-pieces 111 111 are placed upon the top surfaces of the said side pieces 110 110, and are held thereto by bolts 113 113, passing upwardly through flanges of the side pieces and entering holes in the said bearing-pieces. Set-screws 114 114 pass through upturned lugs 115 115 on the side pieces 110 110, and their ends constitute abutments, which limit the movement of the bearing-pieces away from the lifting-shaft 108. Bolts 113 113 pass through slots 113' in the flanges referred to, in order to permit adjustment of the bearing-pieces upon the side pieces. The screws 114 114 may be turned so as to cause their inner ends to project more or less through the lugs 115 115. After the rail-link 109 has been moved into position to place the teeth of the gear 104 in mesh with the teeth of the change-gear 98 it is secured in place by a bolt 116, which is passed through a hole in one of the side pieces 110, and also through a slot 117 in the rail-link set-piece 118. The said set-piece 118 is bolted to a stand 119, which in turn is bolted to the framing, and the slot 117 is made concentric with the axis of the lifting-shaft 108. A cover 120, (see Figs. 38 and 39,) fitting over gear 107, as shown in Fig. 36, is bolted to the bridging-piece 112. This cover is omitted from Fig. 35.

In Figs. 44 and 45 I have shown in relatively-reduced scale a cover 121, intended to be placed in front of the gears 98 and 104, the said cover being formed with the lugs 122 122, adapted to be fitted into notches 123 in lugs formed on the set-piece 118 and shown in Fig. 36.

It sometimes becomes necessary, in making changes to provide for very fine work or very coarse work, to replace the gear 104 by one of different dimensions. It is sometimes deemed preferable for extremely-fine work to introduce additional gearing intermediate the lay change-gear 98 and the main lifting-gear 107. In this latter case I arrange, as shown in Figs. 46 and 47, the gear 104 to turn loosely on the shaft 105, instead of fixing it to turn therewith, and I affix to the side thereof a pinion 124, meshing with a pinion 125, which is connected with another pinion 126, in turn meshing with a pinion 127, that is made fast upon the shaft 105. The pinions 125 and 126 turn together on a stud 128, which is placed in the slot 129 in one of the bearing-pieces 111 and clamped at the desired point in the said slot by the nut 130. Like many of the other parts herein described, the rail-link and connected parts are so constructed as that but one pattern is required in making them, whether they are intended to be used in a right-hand frame or a left-hand frame. It will be seen that the rail-link therefore is made symmetrical in its construction on opposite sides of the middle line thereof.

The lifting-shaft 108 carries pinions 131, (see Figs. 48 and 49,) engaging with racks 132 132, which are connected with the lifting or traverse rail 133. To the said rail are bolted stands 134 134, and through the projecting arms of these stands and arms 135 135, projecting from slides 137, on which the racks 132 are formed, pass bolts 136, having thereon securing-nuts 137'. The arms 135 are flanged, as shown clearly in Figs. 50 and 51, and receive between the flanges thereof the arms of the stands 134. The slides 137 move up and down within recessed guideways 138, formed in the sides of the samsons or intermediate cross-pieces of the framing, all as shown most clearly in Figs. 48, 49, and 50.

The changes in the position of the tumbler-head, which result in the reversal of the direction of the movement of the lifting or traverse rail, are occasioned by the action of the crank 60, attached to the end of the reverse-shaft 46, to which shaft is communicated an intermittent movement or rotation. At each movement this shaft turns through one-half a revolution.

The time at which each movement shall occur is determined and controlled by means of the tumbling-dog 58 and taper-motion devices co-operating therewith. (See Figs. 52, 53, and 54.) The tumbling-dog, which is mounted upon the tumbling-shaft 14, as hereinbefore described, has oppositely-projecting arms 140 140, extending in different horizontal planes and carrying at the extremities thereof contact portions or pads 141 141, which are intended to come in contact alternately with the jaws 142 143, mounted upon the taper-motion head 139. After each half revolution or stroke of the tumbling-shaft 14, and as a gap on the segment-gear 13 presents itself beneath the gear 12, one of the said pads 141 comes in contact with the face of one of the jaws 142 143, this arresting the movements of the parts at the proper point, the said pad being held pressed against the said jaw by the action of the end of the spring-actuated arm 37 against the apex of that nose or riser 35 of the cam 34 on the reverse-shaft 46 with which the inclined portion of the end of said arm is in contact at the moment when the pad strikes the jaw. The two jaws 142 143 are mounted upon that side of the taper-motion head 139 which is presented toward the rear of the machine. To the head 139 is affixed the rack 144, Fig. 54, which is engaged by the gear 145, carried by the lifting-shaft 108, and thereby the taper-motion head is moved vertically, like the lifting or traverse rail. When in the movement of the taper-motion head the jaws 142 143 are carried beyond the pad 141, which has just been resting against the said jaws, the starting or impulse devices, which are shown in Figs. 14, 15, and 16, are permitted to act, and thereupon they throw the tumbling-shaft 14 around a sufficient distance to place the teeth of one of the segments of the gear 13 in mesh with the teeth of the gear 12. The engagement of the teeth of the said segment with the teeth of the gear 12 having occurred, the shaft 14 is rotated positively through half a revolution, until the opposite gap in the wheel 13 comes beneath the wheel 12 and the other pad 141 of the tumbling-dog strikes against one of the jaws 142 143. In order that after one of the pads 141 has been passed by the jaws 142 143 in the movement of the taper-motion head in either direction the other of said pads may contact with the jaws at the end of the ensuing half-revolution of the tumbling-shaft 14, the pads are offset vertically in relation to each other—that is to say, disposed in different horizontal planes, as shown clearly in Fig. 52.

The position of the tumbling-dog never changes vertically; but when the taper-motion jaws are carried upward above the position of the pad carried by the lower arm of the tumbling-dog the spring 39 immediately imparts an impulse to the tumbling-shaft, the revolution thereof continuing until the upper arm of the tumbling-dog comes in contact with the taper-motion jaws. While this half-rotation of the tumbling-shaft is taking place the direction of the rotation of the lifting-shaft is reversed and the taper-motion head begins to descend. The descent continues until the upper taper-motion jaw has descended below the face of the pad carried by the upper arm of the tumbling-dog. The tumbling-shaft is then caused to make a half-revolution, and the operation is repeated.

In order that the load of material placed upon each bobbin wound in the machine may be wound with tapering ends, the jaws 142 143 are, as usual, formed with threaded openings through the tail portions thereof and fitted upon the threaded portions of the right-and-left screw 146, Figs. 52 and 54. This screw is fitted to turn in bearings provided therefor in blocks 147 147, which are secured by screws 148 148 to one side of the taper-motion head 139. Above the taper-motion head the smooth stem or shaft of the screw is formed with the longitudinal groove 149, and the said stem or shaft passes through the central opening or eye of a gear 150, (see particularly Figs. 52, 55, and 56,) which is termed the "builder-gear," and is mounted to turn in a support 154, affixed to a part of the machine-framing. The stem or shaft thereby is supported in a vertical position through the intervention of the support 154. The said gear 150 is engaged by the gear 151, turning in unison with the gear 152, which latter engages with the teeth of the cone-rack 15. The gear 150 carries a key 153, entering the groove 149 in the taper-motion screw 146, and thus as the cone-rack 15 is gradually moved endwise in the operation of the machine to shift the cone-belt 11 along the cones 9 10 the taper-motion screw 146 is slowly turned and draws the jaws 142 143 closer together, so as to release the tumbling-dog 58 at progressively-shorter intervals and correspondingly shorten the traverses of the lifting or traverse rail, thereby making each successive layer of roving shorter than the preceding layer. The hub 170 of the gear 150 is fitted to a bearing formed therefor in a plate 154, one end of which is placed between depending lips 155 on the horizontal flange 156 of a stand or bracket, which is secured to a convenient portion of the machine-framing by bolts 157 157, passing through the vertical flange 158 thereof and having nuts 159 159 and washers 160 160 applied to the threaded ends thereof. The plate 154 is clamped to the flange 156 by a bolt 161, having a nut 162 and washer 163 applied to the threaded end thereof. The gear 151 is applied to the reduced upper end of a stud 164 and held thereon by a nut 165, applied to the threaded upper end of said stud, the said stud having thereon between the nut 165 and gear 151 a washer 166, which is sufficiently great in diameter to project beyond the ends of the teeth of the gear 151 and overlie a portion of the gear 150, the said washer thereby serving to prevent the gear 150 from being raised as the screw 146 moves vertically. The gear 152 is mounted upon the reduced lower end of the stud 164 and held thereto by the nut 167, which is applied to the threaded lower end of said stud. The gear 152 is a change-gear, and in order to permit the use of gears 152 of different dimensions the stud 164 has its bearing in a swing-piece 168, formed with an opening therethrough, which enables the said swing-piece to be slipped upon the exterior of a downwardly-projecting boss or nipple 169, forming part of the plate 154. Through the interior of the said boss or nipple passes the hub or sleeve 170, forming part of the gear 150. The swing-piece 168 is held to the under side of the plate 154 by a bolt 171, having applied to the threaded end thereof the washer 172 and nut 173. This bolt passes through a curved or arc-shaped slot 174, which is made in the plate 154, in order to provide for the rotary adjustment of the swing-piece 168, which is necessary in order to compensate for the use of gears 152 of varying dimensions.

In order to provide for adjusting the plate 154 so as to bring the same and the parts supported thereby, including the taper-motion screw, into the proper position relative to the other parts of the machine, I form the opening 175 in the said plate, through which the bolt 161 passes, as a slot extending lengthwise of the plate, and I form the vertical flange 158 of the supporting-stand with vertical slots for the reception of the bolts 157 157, while the openings 177 177 in the adjacent portion of the framing through which the said bolts also pass are made as horizontal slots, they crossing the slots 176 176 at right angles.

The taper-motion head 139 slides vertically upon the taper-motion guide-bar 178. This bar in cross-section is symmetrically shaped. In practice I make it substantially I-shaped, as in Fig. 54 of the drawings, although it may be constructed so that its cross-section shall present a simple oblong rectangle. The taper-motion head 139 is shaped to receive the said bar and bear against three of the sides thereof, the fourth side being borne against by the taper-motion rack 144, which is applied to the side of the taper-motion head so as to form a cover for the opening which is left therein for the reception of the bar, the said rack being held to the taper-motion head by the screws or bolts 179 179, having washers 180 180 placed under the heads thereof, the rack being provided with slots 181 181, through which the screws or bolts 179 179 pass to permit the rack to be adjusted upon the head. Both jaws 142 143 have parallel plane-surfaced sides, as indicated in Fig. 54, in order to facilitate the dressing of the surfaces in the process of construction, and so that they may be easily moved toward and from each other in consequence of the rotation of the taper-motion screw. The rack and its web, as well as the taper-motion head, are symmetrically formed on opposite sides of a horizontal line passing through the same at mid-height.

A guide-bar, taper-motion head, rack, and taper-motion jaws, made as shown in the drawings, are fitted for use in either a right-hand machine or a left-hand machine, as may be desired, without change of form. In Fig. 54 I have shown the parts just mentioned assembled as would be required for a right-hand machine, and combined with a so-called "right-hand taper-motion screw," the latter usually being formed for convenience with the upper portion of the thread thereof right-handed. In applying the parts to a left-hand machine the taper-motion head and its rack would be mounted upon the guide-bar without further change than that involved in being turned end for end or reversed vertically and in being placed with its rack on the left-hand side of the guide-bar instead of on the right-hand side thereof, as in Fig. 54. The jaws 142 143 would be changed in position so as to place the jaw 143 above the jaw 142. The right-hand taper-motion screw 146 would be replaced by a left-hand taper-motion screw, the latter being usually formed for convenience with the upper part of the thread thereof left-handed. The lower end of the bar 178 is bolted to the reverse stand 72, Figs. 20 to 25. At its upper end said bar 178 is held against the face of a stand 185, Figs. 58 and 59, by a bolt 182, having a nut 183 and washer 184 upon the threaded end thereof, the foot 186 of said stand being secured to the machine-framing by a bolt 187, having a nut 188 and washer 189 upon the threaded end thereof. The bolt 187 passes through a slot 190 in the foot 186, the said slot being provided so that the stand may be adjusted in a manner to enable the center line of the guide-bar to be brought into a plane that is square with the foot of the stand. In order that the guide-bar may be moved into the desired position in the said plane, the stand 185 is formed with a slot 191 for the passage of the bolt 182 and with lugs 192 192, projecting on opposite sides of the slot. Through the said lugs pass adjusting-screws 193 193, which bear at their inner ends against the opposite edges of the guide-bar 178.

The cone-rack is operatively connected with the reverse-shaft 46 through the following devices: 194 is the so-called "tension driving-gear," it being mounted on the said reverse-shaft 46. This gear meshes (see Fig. 66) with the gear 195, having a connected pinion 196, meshing with the gear 197, having at the side thereof and removably connected therewith in any known and approved manner the change tension-gear 198, which in turn meshes with the gear 1210, mounted on the short horizontal shaft 1200, on which is also mounted the miter-gear 1220, meshing with the miter-gear 1030, mounted on the wind-up shaft 1000, near the lower end thereof. On the said shaft 1000 is also mounted the cone-rack gear 1020, which meshes with the gear 1120, the latter being removably connected with the gear 1111, engaging with the rack 15. The gears 195, 196, 197, and 198 are mounted on the swinging frame 199, (see Fig. 66,) which may be lifted, when desired, to move the gear 195 out of mesh with gear 194. This lifting will be performed, for instance, at the completion of the winding of a set of bobbins, and while the frame is held lifted the wind-up shaft may be turned by hand by power applied to the hand-wheel 1010, mounted thereon, so as to return the cone-rack to its starting position and wind up the frame preparatory to restarting with a new set of bobbins. The shaft 1200, on which the gears 1210 and 1220 are mounted, is supported by the pipe-box 741, forming part of the lower wind-up stand 274, which stand is held by bolts 743 743 to a convenient part 370 of the machine-framing. The said stand 741 is also formed with a step-bearing 742 for the wind-up shaft 1000. To the said part 370 of the machine-framing are also held by bolts 721 and 734, respectively, the upper wind-up stand 720 and the middle wind-up stand 730. The gear 1111 has a reduced hub portion 1112, on which is fitted the gear 1120, a pin 1121 being provided to cause the two gears to rotate in unison. The gear 1111 is placed upon a supporting-stud 733, supported by the extension 731 of the middle wind-up stand 730. The gear 1120 is a change-gear, and therefore in order to compensate for the use of change-gears 1120 of varying dimensions the extension 731 is slotted for the reception of the stud 733 to enable said stud to be moved along said extension, the said stud being secured in adjusted position by the nut 7319 on the threaded end thereof. In order to enable gears 1111 of different sizes to be used, the extension 731 is provided, as shown, with a plurality of slots 732, into either of which the stud 733 may be placed.

For the purpose of supporting the cone-rack 15 and guiding it as it moves endwise in the machine I provide rack-guides 200, (see Figs. 67 and 68,) which are secured by bolts 204 to the samsons 370 and 371, said bolts having nuts 205 on the threaded ends thereof. One of these rack-guides is shown detached and in side elevation in Fig. 68, while in Fig. 69 is shown a view thereof in section on the dotted line 69 69 in Fig. 68. Each of the said guides is formed with an opening therethrough corresponding in shape with the shape of the rack in cross-section, clearance for the teeth of the rack being provided by a lateral extension of the opening. The back of the rack fits against one side of the opening, while the top and bottom edges of the rack, as well as the remaining side thereof above and below the ends of the teeth, have also appropriate guiding-surfaces formed in the rack-guide, as shown. Each rack-guide is formed with bolt-holes 206 206 and with an opening 207 to receive and support the cone-rack guide-rod 203. One end of rod 203 enters a hole in the stand 208, which is held to the samson 372 by the bolts 209, which pass through holes 212 in the said stand and are provided with the nuts 210. To the forward end of the rack 15 is fastened by a bolt 211 the cone-rack saddle 202, the same being a forked or claw-shaped guide-piece, which rests and slides upon the rod 203 and supports the end of the rack which carries the cone-belt guide 16.

I claim as my invention—

1. The combination, with the upper cone-shaft, a gear thereon, the tumbling-shaft, and the segment-gear thereon, which is engaged by the said gear on the upper cone-shaft, of the reverse-shaft, starting devices operating to communicate impulses to said reverse-shaft and comprising a disk on said shaft having projecting portions and a spring-actuated arm acting against such portions, and intermeshing miter-gears carried by the tumbling-shaft and reverse-shaft and formed, as described, with gaps and large teeth, substantially as and for the purposes set forth.

2. The combination, with the reverse-shaft of a builder mechanism for spinning-machines, of starting devices comprising a cam carried by the said shaft and having projecting noses, an arm having a portion which bears upon the cam and acts against the noses thereof, a rotatable stud, upon which said arm is loosely pivoted, a spring surrounding said stud and reacting against the same, and also acting by one end thereof against the arm to bear it against the cam, and means for holding the stud in the desired position of rotary adjustment, substantially as and for the purposes set forth.

3. The combination, with a traverse-rail of a spinning-machine, a reversing gear-wheel, operating connections intermediate the said traverse-rail and reversing gear-wheel, through which the latter serves to communicate movement to the former, and a rotating shaft carrying a driving gear-wheel, of a tumbler-head having gears for transmitting movement from said driving gear-wheel to said reversing gear-wheel in reverse directions, a reverse-shaft operatively connected with said tumbler-head and serving to shift the same to alter the engagement of the transmitting-gears with the reversing gear-wheel, means for giving to the said reverse-shaft movements of partial rotation at intervals, and taper-motion devices determining when the reverse-shaft shall be rotated by the said means, substantially as described.

4. The combination, with a traverse-rail of a spinning-machine, a reversing gear-wheel, operating connections intermediate the said traverse-rail and reversing gear-wheel, through which the latter serves to communicate movement to the former, and a rotating shaft carrying a driving gear-wheel, of a tumbler-head having gears for transmitting movement from said driving gear-wheel to said reversing gear-wheel in reverse directions, a reverse-shaft operatively connected with the tumbler-head and serving to shift the same to alter the engagement of the transmitting-gears with the reversing gear-wheel, the tumbling-shaft, gearing between the same and the reverse-shaft, means for giving to the tumbling-shaft movements of partial rotation at intervals, and taper-motion devices determining when the tumbling-shaft and reverse-shaft shall be rotated, substantially as described.

5. The combination, with the traverse-rail of a spinning-machine, a reversing gear-wheel, operating connections intermediate the said traverse-rail and reversing gear-wheel, through which the latter serves to communicate movement to the former, and a rotating shaft carrying a driving gear-wheel, of a tumbler-head having gears for transmitting movement from said driving-gear to said reversing gear-wheel in reverse directions, a reverse-shaft carrying a crank engaging with said tumbler-head and serving to shift the same to alter the engagement of the transmitting-gears with the reversing gear-wheel, a tumbling-shaft to which the reverse-shaft is geared, means for imparting to the tumbling-shaft and reverse-shaft movements of partial rotation at intervals, and taper-motion devices for determining when the said shafts shall be given their movements of partial rotation, substantially as described.

6. The combination, with a rotating shaft and reversing transmitting-gearing operated therefrom, of means for shifting the said gearing to reverse the direction of the movement which is transmitted, a reversing gear-wheel actuated through the said transmitting gearing, a lay-shaft on which said reversing gear-wheel is mounted and which is made in separate portions united by a coupling, a traverse-rail, a lifting-shaft engaging therewith to move the same, and operating connections between the lay-shaft and lifting-shaft, connecting with the latter at or near mid-length thereof, substantially as described.

7. The combination, with a lifting-shaft and the gear-wheel on said shaft, of the rail-link having the sides thereof provided with bearings fitted to the said shaft on opposite sides of the said gear-wheel, a short shaft mounted in bearings with which the sides of the said rail-link are provided, a gear-wheel fixed to said short shaft between the bearings therefor and engaging the gear-wheel on the lifting-shaft, a rotating shaft, change-gear connections intermediate said shaft and the short shaft, and means for holding the rail-link in the required position of adjustment around the axis of the lifting-shaft, substantially as described.

8. The combination, with the lifting-shaft and a gear-wheel on said shaft, of the rail-link having the sides thereof provided with bearings fitted to the said shaft on opposite sides of the said gear-wheel, bearing-pieces mounted upon the opposite sides of the said rail-link, devices for setting the said bearing-pieces in the desired position of adjustment upon the sides of the said rail-link and for holding the same in adjusted position, a short shaft mounted in bearings in the said bearing-pieces and carrying a gear between the said bearing-pieces in engagement with the gear on the lifting-shaft, a rotating shaft, change-gear connections intermediate said shaft and the said short shaft, and means for holding the rail-link in the required position of adjustment around the axis of the lifting-shaft, substantially as described.

9. The combination, with the lifting-shaft and a gear-wheel on said shaft, of the rail-link having the sides thereof provided with bearing-pieces fitted to the same on opposite sides of the said gear-wheel, the said bearing-pieces having bearings for a shaft therein and also slots above said bearings, a short shaft mounted in the said bearings, a gear-wheel fixed to the said shaft between the bearing-pieces and engaging the gear-wheel on the lifting-shaft, another gear-wheel turning with the short shaft, a connected pair of carrier gear-wheels, one of which is in mesh with the last-mentioned gear-wheel on the short shaft, a stud adjustably secured in the slot of one of the bearing-pieces and on which said pair of carrier gear-wheels is free to turn, a connected pair of gear-wheels turning loosely upon the short shaft and one of which meshes with one of the carrier gear-wheels, a rotating shaft, a change-gear thereon with which meshes the other of the loose gear-wheels on the short shaft, and means for holding the rail-link in the required position of adjustment around the axis of the lifting-shaft, substantially as described.

10. The combination, with the wind-up shaft, the cone-rack gear fixed thereon, and the rack, of the middle wind-up stand with a plurality of slots therein, a stud adjustably fixed in one of the said slots, and a pair of connected change gear-wheels mounted to turn upon the said stud, one of the said gear-wheels being in engagement with the rack and the other with the cone-rack gear, substantially as described.

11. The combination, with the machine-framing, the rack, and a guide-rod, of the guide-piece which is affixed to the rack and fitted to slide upon the guide-rod and rack-guides fixed to the framing and shaped to receive and support the rack as it slides along, substantially as described.

12. The combination, with the machine-framing, the rack, and a guide-rod, of the forked or claw-shaped guide-piece or saddle which is affixed to the rack and fitted to slide upon the guide-rod, a stand for one end of the guide-rod, bolted to the framing, and guides for the rack, also bolted to the framing, shaped to receive and support the rack as it slides along, and assisting to support the guide-rod, substantially as described.

13. The combination, with the rack, the taper-motion screw, and the gear-wheels through which the rack serves to impart rotation to the screw, of a pivoted support for the carrier gear-wheels, capable of being swung on its pivot, and means for securing the pivoted support in desired position, substantially as described.

14. The combination, with a slotted frame-piece, of a stand having slots therein at right angles to those in the frame-piece and also having guide-lips on a horizontal portion thereof, bolts passing through both sets of slots and serving to hold the stand adjustably in place upon the frame-piece, a supporting-piece placed between the said lips and formed with a longitudinal slot, a bolt passing through the said slot and a hole in the horizontal portion of the stand, and the taper-motion screw guided in its upper portion by passing through the said supporting-piece, substantially as described.

15. The combination, with the rack, the taper-motion screw, and a slotted frame-piece, of a stand having slots therein crossing at right angles those in the frame-piece and also having guide-lips on a horizontal portion thereof, bolts passing through both sets of slots and serving to hold the stand adjustably in place upon the frame-piece, a supporting-piece placed between the said lips and formed with a longitudinal slot and an arc-shaped slot, a bolt passing through the said longitudinal slot and through a hole in the horizontal portion of the stand, a support having a hub fitted to an opening through the supporting-piece and thereby pivoted to said supporting-piece, a bolt passing through the arc-shaped slot in the latter and a hole in the support, a gear-wheel having a sleeve fitted within the hub of the support and keyed or feathered to the taper-motion screw, and a connected pair of carrier gear-wheels meshing with the gear just mentioned and the rack and carried by the pivoted support, substantially as described.

16. The combination, with the machine-framing, of the taper-motion guide-bar, the stand at the upper end of the said guide-bar, means for securing the said stand to the machine-framing and holding it adjustably thereto, as described, to enable the center line of the guide-bar to be brought into a plane that is square with the foot of the stand, and adjusting-screws whereby the center line of the guide-bar may be moved in the said plane into the desired position, substantially as described.

17. The combination, with the lifting-shaft and a gear thereon, of the taper-motion guide-bar, the taper-motion head fitting three sides of the said bar, the taper-motion rack bearing against the fourth side of the said bar, and means for securing the said rack to the said head, substantially as described.

18. The combination, with the lifting-shaft, a gear thereon, the tumbling-shaft and its dog, the taper-motion screw having the right-hand and left-hand threaded portions, and means for rotating the said screw from the tumbling-shaft, of the taper-motion guide-bar, the taper-motion head fitting three of the sides of the said bar, the taper-motion rack bearing against the fourth side of the said bar, means for securing the said rack to the said head, and the taper-motion jaws having parallel plane-surfaced sides, substantially as described.

In testimony whereof I affix my signature in presence of two witnesses.

WILLIAM PITT CANNING.

Witnesses:
SAML. G. STEPHENS,
EMMA F. ESTES.